United States Patent
Wang et al.

(10) Patent No.: US 12,401,438 B2
(45) Date of Patent: Aug. 26, 2025

(54) EVICTION OF WEAKLY CORRELATED SIGNALS FROM COLLECTIONS

(71) Applicant: ORACLE INTERNATIONAL CORPORATION, Redwood Shores, CA (US)

(72) Inventors: Guang C. Wang, San Diego, CA (US); Matthew T. Gerdes, Oakland, CA (US); Kenny C. Gross, Escondido, CA (US); Alan P. Wood, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 733 days.

(21) Appl. No.: 17/715,449

(22) Filed: Apr. 7, 2022

(65) Prior Publication Data
US 2023/0327789 A1 Oct. 12, 2023

(51) Int. Cl.
*H04B 17/391* (2015.01)

(52) U.S. Cl.
CPC .............................. *H04B 17/3912* (2015.01)

(58) Field of Classification Search
CPC ... H04B 17/3912; H04B 17/254; H04B 17/26
See application file for complete search history.

(56) References Cited

U.S. PATENT DOCUMENTS

| 4,686,655 | A | 8/1987 | Hyatt |
| 7,020,802 | B2 | 3/2006 | Gross et al. |
| 7,191,096 | B1 | 3/2007 | Gross et al. |

(Continued)

FOREIGN PATENT DOCUMENTS

| CN | 107181543 A1 | 9/2017 |
| CN | 110941020 A1 | 3/2020 |

(Continued)

OTHER PUBLICATIONS

Abebe Diro et al.; A Comprehensive Study of Anomaly Detection Schemes in IoT Networks Using Machine Learning Algorithms; pp. 1-13; 2021; downloaded from: https://doi.org/10.3390/s21248320.

(Continued)

*Primary Examiner* — Mi'schita' Henson
(74) *Attorney, Agent, or Firm* — Kraguljac Law Group LLC

(57) ABSTRACT

Systems, methods, and other embodiments associated with eviction of weakly correlated signals from collections are described. In one embodiment, a mock signal that has random signal properties is generated. A mock correlation coefficient between the mock signal and a measured time series signal from a collection of measured time series signals is then generated. A discrimination value that indicates a weak signal correlation is then selected, based at least in part on the mock correlation coefficient. A first measured signal is then identified from the collection of measured time series signals that has the weak signal correlation by determining that a first correlation coefficient between the first measured signal and a second measured signal is weak based on the discrimination value. The first measured signal is then evicted from the collection of signals in response to the determination that the first measured signal has the weak signal correlation.

20 Claims, 17 Drawing Sheets

(56) References Cited

U.S. PATENT DOCUMENTS

| | | |
|---|---|---|
| 7,281,112 B1 | 10/2007 | Gross et al. |
| 7,292,659 B1 | 11/2007 | Gross et al. |
| 7,391,835 B1 | 6/2008 | Gross et al. |
| 7,542,995 B2 | 6/2009 | Thampy et al. |
| 7,573,952 B1 | 8/2009 | Thampy et al. |
| 7,613,576 B2 | 11/2009 | Gross et al. |
| 7,613,580 B2 | 11/2009 | Gross et al. |
| 7,702,485 B2 | 4/2010 | Gross et al. |
| 7,869,977 B2 | 1/2011 | Lewis et al. |
| 8,055,594 B2 | 11/2011 | Phanekula et al. |
| 8,069,490 B2 | 11/2011 | Gross et al. |
| 8,150,655 B2 | 4/2012 | Dhanekula et al. |
| 8,200,991 B2 | 6/2012 | Vaidyanathan et al. |
| 8,214,682 B2 | 7/2012 | Madyanathan et al. |
| 8,275,738 B2 | 9/2012 | Gross et al. |
| 8,341,759 B2 | 12/2012 | Gross et al. |
| 8,365,003 B2 | 1/2013 | Gross et al. |
| 8,457,913 B2 | 6/2013 | Zwinger et al. |
| 8,543,346 B2 | 9/2013 | Gross et al. |
| 9,514,213 B2 | 12/2016 | Wood et al. |
| 9,933,338 B2 | 4/2018 | Noda et al. |
| 10,015,139 B2 | 7/2018 | Gross et al. |
| 10,452,510 B2 | 10/2019 | Gross et al. |
| 10,496,084 B2 | 12/2019 | Li et al. |
| 10,860,011 B2 | 12/2020 | Gross et al. |
| 10,929,776 B2 | 2/2021 | Gross et al. |
| 11,042,428 B2 | 6/2021 | Gross et al. |
| 11,055,396 B2 | 7/2021 | Gross et al. |
| 11,255,894 B2 | 2/2022 | Wetherbee et al. |
| 11,392,786 B2 | 7/2022 | Gross et al. |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2009/0099830 A1 | 4/2009 | Gross et al. |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0161525 A1 | 6/2010 | Gross et al. |
| 2010/0305892 A1 | 12/2010 | Gross et al. |
| 2010/0306165 A1 | 12/2010 | Gross et al. |
| 2012/0030775 A1 | 2/2012 | Gross et al. |
| 2013/0157683 A1 | 6/2013 | Lymberopoulos et al. |
| 2015/0137830 A1 | 5/2015 | Keller, III et al. |
| 2016/0098561 A1 | 4/2016 | Keller et al. |
| 2017/0163669 A1 | 6/2017 | Brown et al. |
| 2018/0011130 A1 | 1/2018 | Aguayo Gonzalez et al. |
| 2018/0276044 A1 | 9/2018 | Fong et al. |
| 2018/0349797 A1 | 12/2018 | Garvey et al. |
| 2019/0102718 A1 | 4/2019 | Agrawal |
| 2019/0163719 A1 | 5/2019 | Gross et al. |
| 2019/0188584 A1 | 6/2019 | Roa et al. |
| 2019/0196892 A1 | 6/2019 | Matei et al. |
| 2019/0197145 A1 | 6/2019 | Gross et al. |
| 2019/0237997 A1 | 8/2019 | Tsujii et al. |
| 2019/0243799 A1 | 8/2019 | Gross et al. |
| 2019/0286725 A1 | 9/2019 | Gawlick et al. |
| 2019/0378022 A1 | 12/2019 | Wang et al. |
| 2020/0125819 A1 | 4/2020 | Gross et al. |
| 2020/0201950 A1 | 6/2020 | Wang et al. |
| 2020/0387753 A1 | 12/2020 | Brill et al. |
| 2021/0081573 A1 | 3/2021 | Gross et al. |
| 2021/0158202 A1 | 5/2021 | Backlawski et al. |
| 2021/0174248 A1 | 6/2021 | Wetherbee et al. |
| 2021/0270884 A1 | 9/2021 | Wetherbee et al. |
| 2022/0121955 A1 | 4/2022 | Chavoshi et al. |

FOREIGN PATENT DOCUMENTS

| | | | |
|---|---|---|---|
| DE | 4447288 A1 | 7/1995 | |
| WO | WO-2023213417 A1 * | 11/2023 | ........... G01N 27/333 |

OTHER PUBLICATIONS

Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.
Garcia-Martin Eva et al., "Estimation of Energy Consumption in Machine Learning," Journal of Parallel and Distributed Computing, Elsevier, Amsterdan, NL, vol. 134, Aug. 21, 2019 (Aug. 21, 2019), pp. 77-88.
Patent Cooperation Treaty (PCT), International Search Report and Written Opinion issued in PCT International Application No. PCT/US2020/060083 having a date of mailing of Mar. 19, 2021 (13 pgs).
Patent Cooperation Treaty (PCT), International Search Report and Written Opinion issued in PCT International Application No. PCT/US2021/015802 having a date of mailing of May 28, 2021 (13 pgs).
Patent Cooperation Treaty (PCT), International Search Report and Written Opinion issued in PCT International Application No. PCT/US2021/013633 having a date of mailing of May 6, 2021 (10 pgs).
Huang H, et al. "Electronic counterfeit detection based on the measurement of electromagnetic fingerprint," Microelectronics Reliability: an Internat . Journal & World Abstracting Service, vol. 55, No. 9, Jul. 9, 2015 (Jul. 9, 2015) pp. 2050-2054.
Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.
Patent Cooperation Treaty (PCT), International Search Report and Written Opinion issued in PCT International Application No. PCT/US2021/014106 having a date of mailing of Apr. 26, 2021 (9 pgs).
Patent Cooperation Treaty (PCT), International Search Report and Written Opinion issued in PCT International Application No. PCT/US2021/015359 having a date of mailing of Apr. 9, 2021 (34 pgs).
Gross et al.; "Application of a Model-Based Fault Detection System to Nuclear Plant Signals," May 1, 1997.
Singer et al.; "Model-Based Nuclear Power Plant Monitoring and Fault Detection: Theoretical Foundations," ISAP 97—Seoul Korea, Jul. 6, 1997.
Gribock, et al.; "Use of Kernel Based Techniques for Sensor Validation in Nuclear Power Plants," International Topical Meeting (NPIC & HMIT), Nov. 2000.
Gou, Yuhua, Implementation of 3d Kiviat Diagrams. (2008). (Year: 2008).
Abran et al.; Estimation Models Based on Functional Profiles. Intl. Workshop on Software Measurement—IWSM/MetriKon, Kronisburg (Germany), Shaker Verlag. 2004 (Year: 2004).
Wang, Ray C., et al., Process Fault Detection Using Time-Explicit Kiviat Diagrams. AlChE Journal 61.12 (2015): 4277-4293.
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
Gross et al.; MSET2 Overview—Anomaly Detection and Prediction Oracle Cloud Automomous Prognostics; pp. 1-58; Aug. 8, 2019.
Whisnant et al.; "Proactive Fault Monitoring in Enterprise Servers," IEEE—International Multiconference in Computer Science & Computer Engineering (Jun. 27-30, 2005) 11 pgs.
US Nuclear Regulatory Commission; "Technical Review of On-Line Monitoring Techniques for Performance Assessment," vol. 1, Jan. 31, 2006.
Patent Cooperation Treaty (PCT), International Search Report and Written Opinion issued in PCT International Application No. PCT/US2021/062380 having a date of mailing of May 24, 2022 (10 pgs).
Udemy Blog: Correlation Coefficient Interpretation: How to Effectively Interpret the Correlation Coefficient (Mar. 2, 2022) 4 pgs.

\* cited by examiner

EVICTION OF WEAKLY CORRELATED SIGNALS FROM COLLECTIONS

BACKGROUND

Time series signals include a set of measured signals or data points in a time order. The measured signals or data points may be associated with a particular event or particular condition and are measured in a sequence of time data. Analysis of time series signals may be performed to identify statistics, patterns, and/or characteristics of the data and thus of the event or condition.

Time series signals/data may include hundreds, thousands, or millions of measured signals in a time sequence. It is not unusual for time series data to include signals that do not correlate with the other measured signals, are inaccurate, mismeasured, or otherwise problematic. However, it is very difficult and sometimes impossible to identify which signals are problematic. A device or model that attempts to analyze the time series signals that includes problematic signals will likely produce inaccurate results. For example, a Multivariate ML anomaly detection depends upon some degree of cross correlation between the time series signals being analyzed. If the time series signals include uncorrelated or even weakly correlated signals, this may interfere with the anomaly detection.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
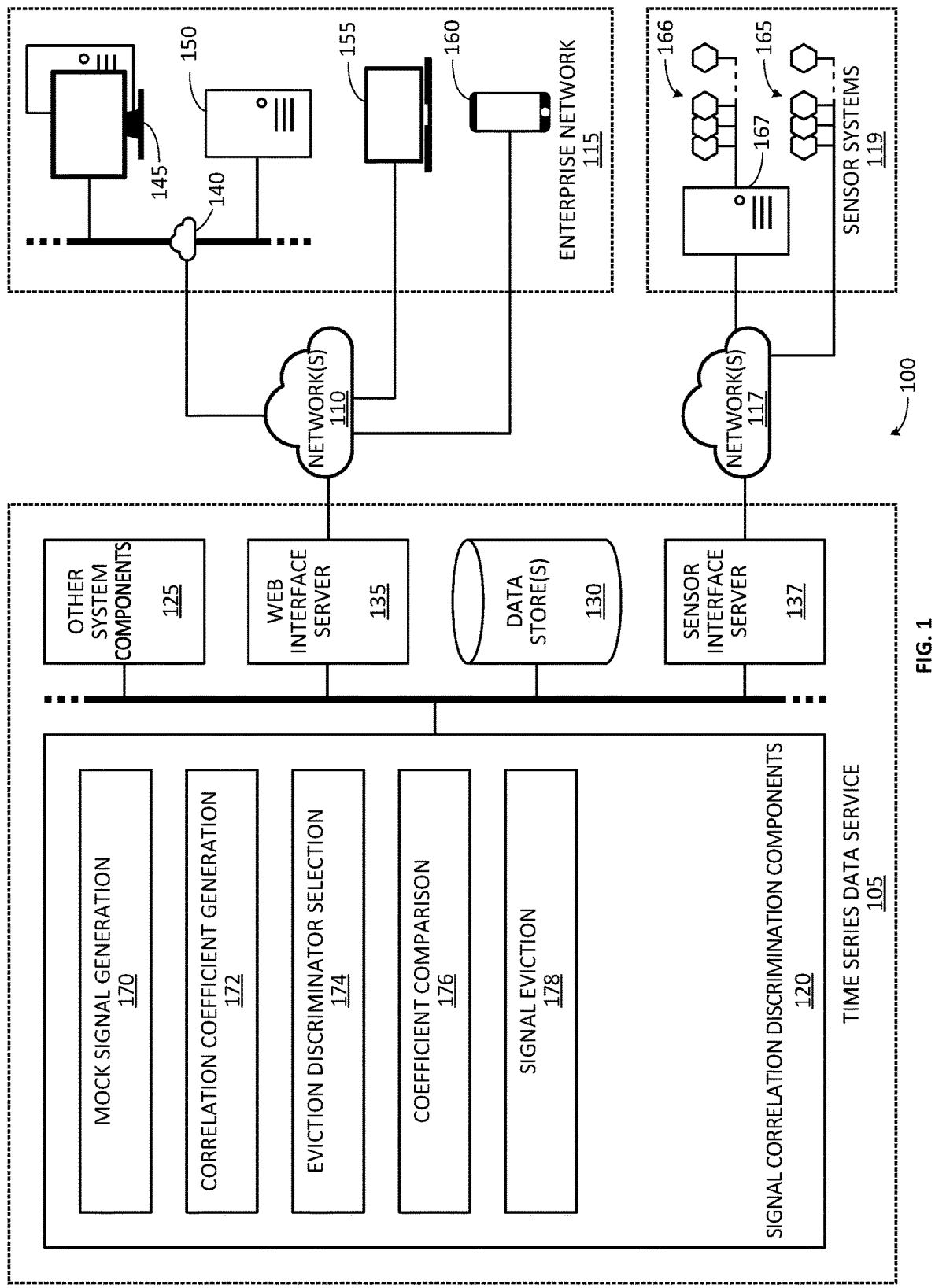
FIG. 1 illustrates one embodiment of a system associated with eviction of weakly correlated signals from multivariate anomaly detection models.

Systems, methods, and other embodiments are described herein that provide robust identification and eviction of weakly correlated signals from a set of time series signals. In one embodiment, signals that have minimal correlation with other signals do not contribute to prognostic performance of a signal analysis system, for example, a multivariate ML anomaly detection model or algorithm Thus, the minimal or weakly correlated signals are identified and excluded (evicted) from the time series signals prior to being input to the ML model. In one embodiment, the present eviction systems and methods implement a novel technique using mock signals made up of random values to identify and remove measured signals that do not correlate with the other measured signals at least as well as a mock signal(s).

Prior techniques, for example applying a simple cutoff threshold for correlation, wrongly discard good signals because the simple cutoff threshold cannot properly identify the correlation where the correlation is hidden by noise or other factors. Yet the prior techniques will still retain uncorrelated signals because they are not identified by the simple threshold.

In one embodiment, the present eviction systems and methods may dramatically improve the accuracy with which weakly correlated signals are detected and removed over prior techniques by applying an eviction discriminator. Furthermore, the eviction discriminator more accurately identifies and retains signals with hidden correlation that should not be evicted. Retaining the signals with hidden correlation results in more accurate multivariate ML anomaly detection models.

In one embodiment, the eviction systems and methods described herein generate one or more mock signals of random values. A mock signal made with random values will be weakly correlated to actual signals from a collection of measured signals. The present system evicts measured signals that are similarly or less correlated to other measured signals as the mock signal. For example, the mock signals are correlated with a collection of measured time series signals. Correlation coefficients between one or more mock signals and one or more measured signals are generated. A correlation coefficient between a mock signal and a measured signal is referred to herein as a mock correlation coefficient. A discrimination value for weak signal correlation is selected or generated based on the mock correlation coefficient. Since the mock signal has random values, the mock signal should be unrelated to any of the measured signals. Thus, the mock correlation coefficient between the mock signal and any selected measured signal (e.g., a first selected measured signal) represents a weak correlation between the two signals. The mock correlation coefficient is then used to identify other measured signals in the time series that weakly correlate to each other based on their correlation coefficient as compared to the mock correlation coefficient.

For example, if a correlation coefficient between a second measured signal and the first measured signal is determined to be similar or smaller (less correlated) than the discrimination value from the mock signal, then the second measured signal is weakly correlated to the first measured signal, just as the mock signal is weakly correlated. Thus, the second measured signal may be evicted from the time series data and is evicted from inclusion in a multivariate anomaly detection model or other model that analyzes the signals. In one embodiment, the present eviction system performs this process throughout a set of time series signals to cleanse the signals and remove uncorrelated signals. This results in a more correlated set of signals, yielding a more accurate ML model, which may improve signal analysis of the time series signals.

No action or function described or claimed herein is performed by the human mind. The actions or functions described or claimed herein cannot be practically performed by the human mind. An interpretation that any action or function can be performed in the human mind is inconsistent with and contrary to this disclosure.

FIG. 1 illustrates one embodiment of an eviction system 100 associated with detection and eviction of weakly correlated signals from a set of time series signals and, for example, from use in a multivariate anomaly detection model. One embodiment of the operation of the eviction system 100 of FIG. 1 is described with reference to an example method 200 shown in FIG. 2. FIGS. 3-14 show example datasets and results that demonstrate particular features and overall effectiveness of the eviction systems and methods disclosed herein. A special-purpose computer embodiment is described with reference to example computing system 1500 of FIG. 15.

—Example Eviction System—

In one embodiment, eviction system 100 includes various components or modules configured to execute and/or support execution of the methods disclosed herein. A more detailed configuration and operation of the components or modules will be described in further detail below. In one embodiment, system 100 includes a time series data service 105 connected by the network(s) 110 (such as the Internet or another suitable communications network or combination of networks) to an enterprise network 115. In one embodiment, time series data service 105 includes various systems and components such as signal correlation discrimination components or modules 120. Signal discrimination components or modules 120 are configured to generate mock signals, generate correlation coefficients among signals, select eviction discriminators, compare correlation coefficients to eviction discriminators, and evict weakly correlated signals as shown and described herein. The signal correlation discrimination components will be described in more detail with reference to FIG. 2.

In one embodiment, time series data service 105 is connected by networks 117 (such as the Internet or another suitable communications network or combination of networks) to sensor systems 119. In one embodiment, networks 110 and 117 are the same network, and in another embodiment, networks 110 and 117 are separate networks. In one embodiment, time series data service 105 includes other system components 125, data store(s) 130, web interface server 135, and sensor interface server 137.

In one embodiment, other system components 125 may include time series data collection components configured for sampling data from various sensors over intervals of time and recording them in time series databases. In one embodiment, other system components 125 may include time series synthesizer components configured for generating simulated time series and/or time series databases based on one or more input statistical parameters, such as parameters for mean, variance, skewness, kurtosis, degree of serial correlation, and/or degree of cross correlation. In one embodiment, other system components 125 may include time series analysis components configured for decomposing time series data into constituent deterministic and stochastic components to derive statistical parameters (such as those mentioned above as inputs for the time series synthesizer components) for the time series data. In one embodiment, other system components 125 may include multivariate and univariate prognostic ML modeling components configured for training ML models to detect anomalies and using trained models to monitor data for anomalies. In one embodiment, these prognostic ML modeling components may be the Oracle Autonomous Anomaly Detection Service available in the Oracle Cloud Infrastructure. In one embodiment, other system components 125 may further include user administration modules for governing the access of users to time series data service 105.

The components of time series data service 105 are configured by logic to execute the functions that the component is described as performing. In one embodiment, the components of the time series data service 105 may be implemented as sets of one or more software modules executed by one or more computing devices specially configured for such execution. In one embodiment, the components of time series data service 105 are implemented on one or more hardware computing devices or hosts interconnected by a data network. For example, the components of time series data service 105 may be executed by network-connected computing devices of one or more compute hardware shapes, such as central processing unit (CPU) or general-purpose shapes, dense input/output (I/O) shapes, graphics processing unit (GPU) shapes, and high-performance computing (HPC) shapes. In one embodiment, the components of time series data service 105 are implemented by dedicated computing devices. In one embodiment, the components of time series data service 105 are implemented by a common (or shared) computing device, even though represented as discrete units in FIG. 1.

In one embodiment, time series data service 105 may be hosted by a third party, and/or operated by a third party for the benefit of multiple account owners/tenants, each of whom may be operating a business, and each of whom may have an associated enterprise network 115. For example, time series data service 105 may be operated in an infrastructure-as-a-service (IAAS), platform-as-a-service (PAAS), or software-as-a-service (SAAS) architecture. In one embodiment, time series data service 105, networks 110 and 117, enterprise network 115, and sensor systems 119 may be associated with business entities operating in any of a variety of industries (such as Oil & Gas production, Utilities, Aviation, and data center IT) which use sensors to monitor the operational health of systems and devices.

In one embodiment, the components of system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of system 100 may (i) generate or compose an electronic message or signal to issue a command or request to another component, (ii) transmit the message or signal to other components of computing system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems (such as those of enterprise network 115) may access information or applications provided by time series data service 105 through web interface server 135. In one embodiment, the remote computing system may send requests to and receive responses from web interface server 135. In one example, access to the information or applications may be effected through use of a web browser on a personal computer 145, remote user computers 155 or mobile device 160. For example, these computing devices 145, 155, 160 of the enterprise network 115 may access signal correlation discrimination components 120 from time series data service 105. In one example, communications may be exchanged between web interface server 135 and personal computer 145, server 150, remote user computers 155 or mobile device 160, and may take the form of remote representational state transfer (REST) requests using JavaScript object notation (JSON) as the data interchange format for example, or simple object access protocol (SOAP) requests to and from XML servers. The REST or SOAP requests may include API calls to components of time series data service 105.

Enterprise network 115 may be associated with a business. For simplicity and clarity of explanation, enterprise network 115 is represented by an on-site local area network 140 to which one or more personal computers 145, or servers 150 are operably connected, along with one or more remote user computers 155 or mobile devices 160 that are connected to enterprise network 115 through network(s) 110. An individual personal computer 145, remote user computer 155, or mobile device 160 is generally dedicated to a particular end user, such as an employee or contractor associated with the business, although such dedication is not required. The personal computers 145 and remote user computers 155 can be, for example, a desktop computer, laptop computer, tablet computer, or other device having the ability to connect to local area network 140 or Internet 110. Mobile device 160 can be, for example, a smartphone, tablet computer, mobile phone, or other device having the ability to connect to local area network 140 or network(s) 110 through wireless networks, such as cellular telephone networks or Wi-Fi. Users of the enterprise network 115 interface with time series data service 105 across network(s) 110.

In one embodiment, sensor systems 119 may include one or more sensors 165, 166 and one or more upstream devices. Time series data service 105 may be connected directly to sensors (such as sensors 165) or upstream devices 167 through sensor interface device 137 and network 117. Time series data service 105 may be connected indirectly to sensors (such as sensors 166) through sensor interface device 137, network 117, and one or more upstream devices 167.

In one embodiment, upstream device 167 may be a third-party service for managing IoT connected devices. In one embodiment, upstream device 167 may be a gateway device configured to enable sensors 166 to communicate with sensor interface server 137 (for example, where sensors 166 are not IoT-enabled, and therefore unable to communicate directly with sensor interface server 137). In one embodiment, upstream device 167 may be a data acquisition unit (DAQ) configured to convert analog telemetry signals from sensors to digital telemetry signals. In one embodiment, upstream device may be a remote terminal unit RTU configured to control a device and provide analog or digital telemetry signals about the device.

In one embodiment, sensors 165, 166 are configured to monitor physical phenomena occurring in or around an asset (such as a machine, device, system, or facility) In one embodiment, sensors 165, 166 may be operably connected or affixed to assets or otherwise configured to detect and monitor physical phenomena occurring in or around the asset. The assets generally include any type of machinery or facility with components that perform measurable activities. The sensors 165, 166 may be network-connected sensors for monitoring any type of physical phenomena. The network connection of the sensors 165, 166, the upstream device 167, and networks 117 may be wired or wireless. The sensors 165, 166 may include (but are not limited to): a voltage sensor, a current sensor, a temperature sensor, a pressure sensor, a scale or other weight sensor, a rotational speed sensor, an angle sensor, a distance sensor, a displacement sensor, a thermometer, a flow meter sensor, a vibration sensor, a microphone, a photosensor, an electromagnetic radiation sensor, a proximity sensor, an occupancy sensor, a motion sensor, a gyroscope, an inclinometer, an accelerometer, a shock sensor, a global positioning system (GPS) sensor, a torque sensor, a flex sensor, a moisture monitor, a liquid level sensor, an electronic nose, a nuclear radiation detector, or any of a wide variety of other sensors or transducers for generating telemetry—electrical signals that describe detected or sensed physical behavior.

In one embodiment, sensor interface server 137 is configured with logic, such as software modules, to collect readings from sensors 165, 166 and store them as observations in a time series data structure, for example in data store 130. In one embodiment, sensor interface server 137 includes a data historian module for creating and interacting with time series data structures (such as time series data archives) in data store 130. The sensor interface server 137 is configured to interact with the sensors, for example by exposing one or more application programming interfaces (APIs) configured to accept readings from sensors using sensor data formats and communication protocols applicable to the various sensors 165, 166 and upstream devices 167.

The sensor data format will generally be dictated by the sensor device or upstream device. The communication protocol may be a custom protocol (such as a legacy protocol predating IoT implementation) or any of a variety of IoT or machine to machine (M2M) protocols such as Constrained Application Protocol (CoAP), Data Distribution Service (DDS), Devices Profile for Web Services (DPWS), Hypertext Transport Protocol/Representational State Transfer (HTTP/REST), Message Queuing Telemetry Transport (MQTT), Universal Plug and Play (UPnP), Extensible Messaging and Presence Protocol (XMPP), ZeroMQ, and other communications protocols that can be carried by the transmission control protocol—internet protocol or user datagram protocol (TCP/IP or UDP) transport protocols. SCADA protocols such as OLE for Process Control Unified Architecture (OPC UA), Modbus RTU, RP-570, Profibus, Conitel, IEC 60870-5-101 or 104, IEC 61850, and DNP3 may also be employed when extended to operate over TCP/IP or UDP. In one embodiment, the sensor interface server 137 polls sensors 165, 166 to retrieve sensor telemetry readings. In one embodiment, the sensor interface server passively receives sensor telemetry readings actively transmitted by sensors 165, 166.

In one embodiment, data store 130 includes one or more databases (such as data historian archives, time-series databases, or signal databases) or other data structures configured to store and serve time series data received by sensor interface server 137 from sensors 165, 166. The time series data may consist of telemetry values sensed by one or more sensors at regular or irregular intervals and stored in association with both the sensor and the time the value was sensed. In one embodiment, the time-series database is a database configured to store and serve time-series data. In some example configurations, data store(s) 130 may be implemented using one or more compute shapes, network-attached storage (NAS) devices and/or other dedicated server devices. API calls may include queries against databases. The queries may be composed in SQL or NOSQL (Not Only SQL) and executed in a SQL/NOSQL runtime, or use other appropriate query languages and environments.

In one embodiment, time series data service 105 is configured with logic, such as software modules, to operate the time series data service 105 to evict weakly correlated signals from multivariate anomaly detection models, in accordance with the systems and methods described herein. In one embodiment, signal correlation discrimination components 120 includes one or more components configured for implementing methods, functions, and features described herein associated with eviction of weakly correlated signals from multivariate anomaly detection models. In one embodiment, signal correlation discrimination components 120 includes mock signal generation module/components 170 configured to generate a mock signal of random values to be used with a collection of measured time series signals; correlation coefficient generation module/components 172 configured to generate correlation coefficients between the signals; eviction discriminator selection module/components 174 configured to select a discrimination value for weak signal correlation based at least in part on a first correlation coefficient between the mock signal and a first signal of the measured time series signals; coefficient comparison module/components 176 configured to determine that a second correlation coefficient between a second signal of the measured time series signals and the first signal is smaller than (i.e., similar to or less correlated than) the discrimination value; and signal eviction module/components 178 configured to evict the second signal from inclusion in a multivariate anomaly detection model in response to the determination that the second correlation coefficient is smaller than the discrimination value; all for example as shown and described in further detail herein. In one embodiment, signal correlation discrimination components 120 includes one or more other components or modules configured for implementing methods, functions, and features described herein.

—Example Method—

In one embodiment, any collection of signals a customer has to analyze with Anomaly Detection ML techniques may be preprocessed to evict weakly correlated signals from the collection of signals, as shown and described herein. Weakly correlated signals are evicted based on comparison with an autonomously derived eviction discriminator that offers superior performance to fixed cut-off threshold approaches to signal eviction. The eviction discriminator for a particular group of signals is autonomously derived rather than retrieved from a lookup table or computed by analytical formula. Lookup tables and analytical calculation fail to provide correct eviction discriminator values at least because every database of signals presented for multivariate ML analysis will have a unique set of statistical parameters, including number of signals (#Sigs), and number of observations (#Obs) (dependent on both sampling rate and duration of data collection), degree of inherent and serial cross correlation, and degree of measurement noise. The unique statistical parameter values for a database of signals are both the reason that cut-off threshold approaches to signal eviction are significantly suboptimal, and the reason that it is intractable to derive some optimum threshold to use for weak-signal eviction discrimination to weed out poorly correlated signals that would otherwise drag down or hinder prognostic performance of multivariate ML anomaly detection models.

Figure 2:
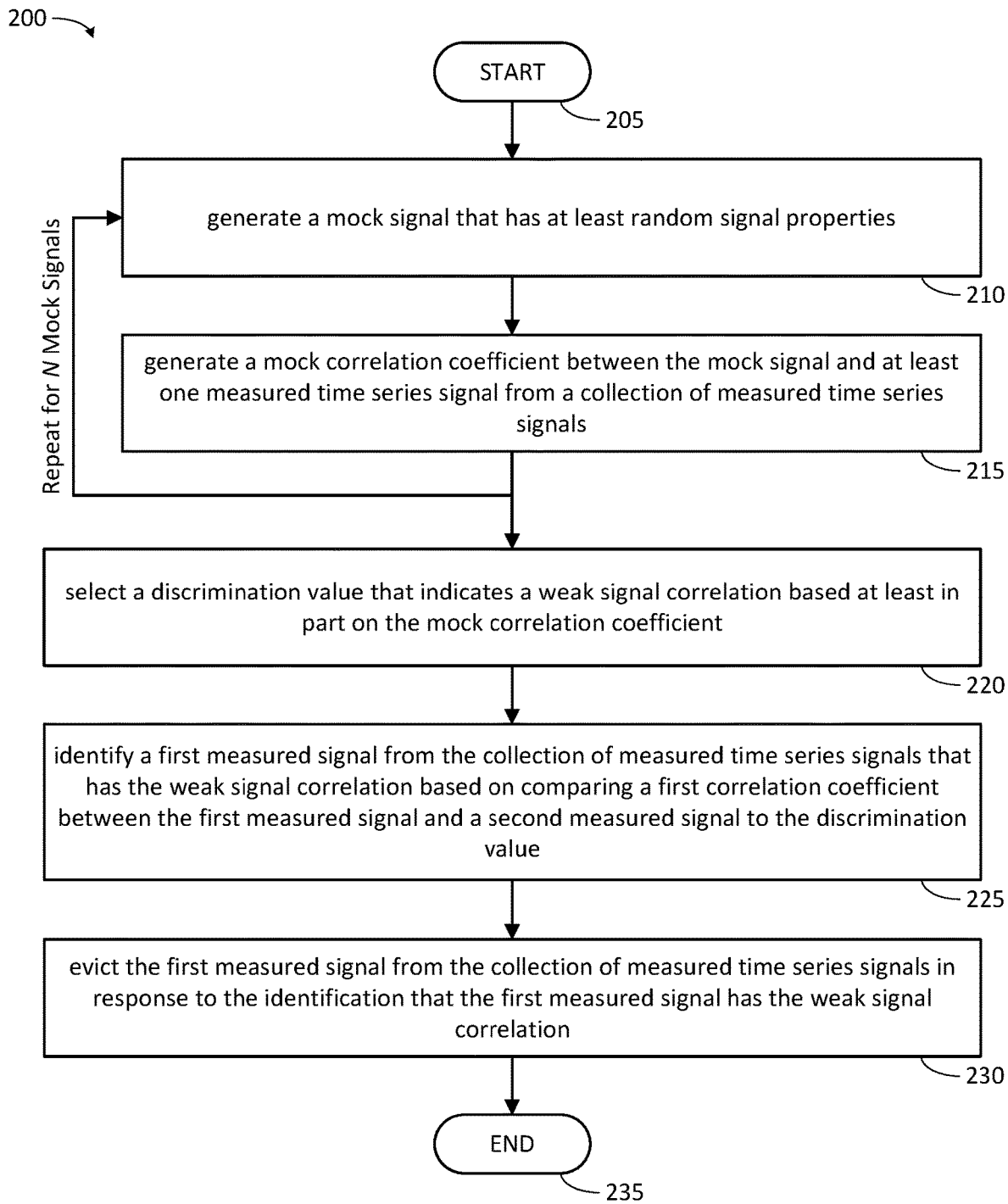
FIG. 2 illustrates one embodiment of a method associated with eviction of weakly correlated signals from multivariate anomaly detection models.

FIG. 2 illustrates one embodiment of an eviction method 200 associated with eviction of weakly correlated signals from multivariate anomaly detection models. The method 200 is a computer-implemented process performed by a computing system, such as eviction system 100. In one embodiment, the steps of method 200 are performed by signal correlation discrimination components 120 (as shown and described with reference to FIG. 1). In one embodiment, signal correlation discrimination components 120 is a special purpose computing device (such as computing device 1505) configured with weakly correlated signal eviction logic 1530 to facilitate eviction of weakly correlated signals from multivariate anomaly detection models. In one embodiment, signal correlation discrimination components 120 is a module of a special purpose computing device configured with logic 1530. The described actions and functions of method 200 are performed at least by a processor that accesses data from a memory or storage device and generates data read from or written to the memory.

In the method of FIG. 2, blocks 210, 215, 220, 225, and 230 correspond respectively to mock signal generation module 170, correlation coefficient generation module 172, eviction discriminator selection module 174, coefficient comparison module 176, and signal eviction module 178 of FIG. 1. The method 200 may be initiated automatically based on various triggers, such as in response to receiving a signal over a network or parsing stored data indicating that (i) a user (or administrator) of time series data service 105 has initiated method 200, (ii) that method 200 is scheduled to be initiated at defined times or time intervals, (iii) that a multivariate anomaly detection ML model is to be trained using a collection of signals, or (iv) that weakly correlated signals are to be evicted from a collection of signals.

As an overview, in one embodiment, for a collection of measured time series signals, the eviction method 200 generates a mock signal that comprises at least random signal properties. It is presumed that the random signal properties of the mock signal are unrelated to signal properties of the measured time series signals. Thus, the mock signal should not correlate to any of the measured signals. A correlation coefficient is generated between the mock signal and at least one measured time series signal from the collection of measured time series signals. This correlation coefficient is referred to herein as a mock correlation coefficient to distinguish it from correlation coefficients between the measured signals.

The mock correlation coefficient represents a value/degree/level of correlation of the mock signal to the measured signal, which should be a low degree of correlation. A discrimination value is selected or generated that indicates a weak signal correlation based at least in part on the mock correlation coefficient. In one embodiment, the discrimination value may be set as the value of the mock correlation coefficient, set as an average value of multiple mock correlation coefficients, or set as a max value of multiple mock correlation coefficients. The discrimination value is used to find measured signals that have a similar weak signal correlation to each other as the weak correlation of the mock signal. A first measured signal from the collection is identified as having the weak signal correlation by determining that a first correlation coefficient between the first measured signal and a second measured signal is weakly correlated based on a comparison to the discrimination value (e.g., the first correlation coefficient is smaller than or similar to the discrimination value). In response to the determination that the first measured signal has the weak signal correlation, the first measured signal is evicted from the collection of measured time series signals. The process may then repeat for multiple signals in the collection, and/or throughout the entire collection of signals to cleanse the collection of uncorrelated signals.

With reference to FIG. 2, the method 200 initiates at START block 205 in response to parsing a signal received or stored data retrieved and determining that the signal or stored data indicates that the method 200 should begin. Processing continues to process block 210.

At process block 210, the processor generates a mock signal that has at least random signal properties and/or values. This may include generating a random amplitude, random frequency, and/or other random values to form the mock signal. In one embodiment, the mock signal is generated and stored in a data structure, so the mock signal is made available (accessible) by the system. In another embodiment, the mock signal is injected into the collection of measured time series signals for correlation analysis. This may include inserting or adding the mock signal at the beginning, within, at the end, and/or alongside of the measured time series signals. The mock signal may be inserted, for example, into a time series database or other collection of measured time series signals. Multiple mock signals may also be used as described below.

In one embodiment the steps of process block 210 are performed by executing mock signal generation module 170. Note that the term "measured" in reference to time series signals herein refers to signals either collected from sensors or other devices monitoring a system, or synthesized by a signal generator to simulate signals collected from sensors or other devices. A measured signal thus should contrast with (and is presumed to be unrelated to) the mock signal, which contains random values. In one embodiment, a time series signal is a data structure including a set of time-stamped or observation-numbered entries of data read from a particular source, such as a sensor. In one embodiment, a time series database or collection of signals is a data structure that includes one or more time series signals sharing a series of time stamps or observation numbers in common.

In one embodiment, a signals database having a set of #Sigs number of time series signals, the signals having length #Obs number of observations. The mock signal may be generated as having a same length #Obs (where equal signal length is used for performing a large cross-correlation). The amplitude values of the mock signal are purely random with time. Note that, with computed cross correlation coefficients (CCCs), there is no difference whether or not the signals have been pre-normalized to a similar amplitude. In one embodiment, a Gaussian random number sequence with a standard deviation (STD) of 1 (unity) is employed for amplitude values of the mock signal. In one embodiment, exponentially distributed random sequences are employed for amplitude values of the mock signal with equally satisfactory performance, because the technique for eviction of weakly correlated signals from multivariate anomaly detection models as shown and described herein is totally scale independent.

In one embodiment, the processor determines the number of observations (#Obs) present in a measured time series signal, or in other words, the processor finds the length of the measured time series signals. Generally, the signals in the collection or database of measured time series signals have the same length or count of observations, so determining the length of one measured time series signal determines the length of other measured time series signals in the time series database. In one embodiment, the processor then executes a Gaussian random number generator to generate #Obs random numbers. In one embodiment, the Gaussian distribution of the generated random numbers has a mean of 0 and a standard deviation of 1, although other means or standard deviations may also be used. In one embodiment, the Gaussian random number generator is initiated with a seed value. The processor thus produces a series of random numbers of the same length as the measured signals in the collection of measured time series signals. The processor then stores the random numbers as amplitude values corresponding to observations of a mock or dummy time series signal of length #Obs, the same length as the measured signals.

In this way, the processor generates a Gaussian random number sequence of a given number of observations to be the mock signal, wherein the signal values of the mock signal are the Gaussian random number sequence, and wherein the given number of observations is a number of observations for the individual measured time series signals. Thus, in one embodiment, the random signal properties of the mock signal are or include the random values at observations in the mock signal, such as random amplitude values. Processing at process block 210 then completes, and processing continues to process block 215. Thus, the mock signal with random values is generated and used for correlation analysis with the collection of measured signals. The random signal values of the mock signal ensures that there is no true or actual correlation between the mock signal and any measured signal in the collection or database.

At process block 215, the processor generates a mock correlation coefficient between the mock signal and at least one measured time series signal from the collection of measured time series signals. The mock correlation coefficient represents a value, degree, or level of correlation of the mock signal to the measured signal, which should be a low degree of correlation. The mock signal (as well as multiple mock signals) may be correlated to (or compared to or analyzed against) multiple measured signals to generate multiple mock correlation coefficients as described below.

The correlation coefficients calculated between the random-valued mock signal and a measured signal is referred to herein as "mock correlation coefficients." A mock correlation coefficient provides a baseline value that indicates how much a signal in the collection may appear to be correlated with another signal in the collection, while being completely un-correlated in actuality. Mock correlation coefficients can be used to develop a discriminator value for finding signals with excessively weak correlation with other signals, for example as discussed below with reference to process block 220.

Correlation coefficients are also generated between two or more of the actual measured time series signals. In one embodiment the steps of process block 215 are performed by executing correlation coefficient generation module 172. In one embodiment, the processor generates cross correlation coefficients between the mock signal and measured signals.

The cross correlation coefficient of two signals is a measure of correlation between the two signals. Correlation as used herein refers to a definable relationship, interconnection, interdependence, connection, or synchrony between signals. In one embodiment, the cross correlation coefficient is the Pearson product-moment correlation coefficient, defined as covariance of the variables divided by the product of the respective standard deviations of the variables. In one embodiment, cross correlation coefficients may present values in a range from +1 to −1, where ±1 indicates the strongest possible correlation between the signals (with negative values indicating an inverse relationship), and 0 indicating total lack of correlation between the signals. Accordingly, the absolute value of the magnitude of the cross coefficient may be used as a measure of correlation between signals where it is irrelevant whether correlation is direct or inverse.

In another embodiment, different cross correlation functions may be used that produce different ranges of correlation coefficients. For example, the cross correlation coefficients may be generated in a range 0 to N, where N is greater than zero. In one embodiment, zero may represent the least correlation (weakest) between signals and N may represent the greatest correlation (best), or vice versa. Other ranges of values may be generated, and the present system is not limited to any particular range of correlation coefficients.

In one embodiment, the processor stores the correlation coefficients (or in one embodiment, their absolute values) in a data structure, such as a matrix of cross correlation coefficients. For example, a matrix of cross correlation coefficient values may be generated that includes the correlation coefficient for each signal (including the measured signals and one mock signal) with each other signal, forming a matrix of dimension (#Sigs+1)×(#Sigs+1). This cross correlation coefficient matrix for the measured signals and one mock signal is stored for subsequent processing.

Processing at process block 215 then completes. At the completion of process block 215, the correlation coefficients calculated between the measured signals indicate the extents to which the measured signals appear to correlate with each other.

Note that, in one embodiment, process blocks 210 and 215 may be repeated for individual insertions of a series of N distinct mock signals in order to reduce the possibility of chance correlation between random and real signals, as discussed below. In one embodiment, therefore, multiple cross correlation coefficient matrices may be generated and stored, one for each of N mock signals generated as described above. In one embodiment, the N mock signals are made available or inserted into the collection of signals as described above. Or, in one embodiment, an additional row and column may be added to a single CCC matrix for each of N mock signals. Once the processor has thus completed generating correlation coefficients between the signals, processing continues to process block 220.

At process block 220, the processor selects a discrimination value that indicates a weak signal correlation based at least in part on the mock correlation coefficient. In one embodiment the steps of process block 220 are performed by executing eviction discriminator selection module 174.

In one embodiment, the processor parses the matrix of cross correlation coefficients to identify a highest absolute value of CCC between the mock signal(s) and the measured signals (which include the first signal), for example by retrieving the ABS(CCC) values for the mock signal from the matrix, comparing ABS(CCC) values in turn with a greatest ABS(CCC) value encountered (starting from 0), replacing the greatest ABS(CCC) value encountered when an ABS(CCC) value exceeds it, and when no further ABS(CCC) values remain from the matrix, concluding that the final greatest ABS(CCC) value encountered is the maximum magnitude cross correlation coefficient (Max(ABS(CCC))) between the mock signal and the measured signals.

In one embodiment, where one mock signal is used or inserted into the collection of measured signals, the Max(ABS(CCC)) associated with the mock signal is selected as the discrimination value (or eviction discriminator). In one embodiment, where multiple distinct mock signals were inserted one-at-a-time into the collection of measured signals (as discussed in further detail below), the Max(ABS(CCC)) between the mock signal and the measured signals for each of the mock signals is found, using the cross correlation coefficients for the particular mock signal from the cross correlation coefficient matrix associated with the particular mock signal. The mean of these multiple Max(ABS(CCC)) values is selected as the discrimination value.

Processing at process block 220 then completes, and processing continues to process block 225. In this way, selection of the Max(ABS(CCC)) (or Mean(Max(ABS(CCC)))) to be the eviction discriminator chooses the correlation coefficient value that indicates the greatest extent to which a signal in the collection may appear to be correlated with another signal in the collection, while being completely un-correlated in actuality. Logically, signals with correlation coefficients above the selected eviction discriminator have some actual correlation. The value of the eviction discriminator may be compared to cross correlation coefficients between measured signals to determine whether the calculated correlation coefficient represents actual correlation of signal activity. For example, as discussed below with reference to process block 225, correlation coefficients falling below the value of the eviction discriminator have excessively weak correlation (e.g., coefficients that are similarly or less correlated). This indicates either lack of actual correlation of signal activity or correlation so low as to possibly hinder performance of signal analysis models that will analyze the weakly correlated signals.

At process block 225, the processor identifies a first measured signal from the collection of measured time series signals that has a weak signal correlation based on comparing a first correlation coefficient between the first measured signal and a second measured signal to the discrimination value. For example, where higher correlation coefficient absolute values indicate better correlation, the comparison may determine that a first correlation coefficient between the first measured signal and a second measured signal is smaller (less correlated) than the discrimination value. In one embodiment the steps of process block 225 are performed by executing coefficient comparison module 176.

Where a known purely random signal—the mock signal—is inserted into the collection/database of signals, and a combinatorial CCC matrix (#Sigs+1)×(#Sigs+1) of the signals (including the mock signal) is performed, it is "safe"—that is, having little to no risk of excluding signals that contribute to the prognostic power of a prognostic ML model—to evict any of the original measured signals for which the absolute value of the cross correlation coefficient (ABS(CCC)) of that measured signal with other measured signals (that are not the mock signal) comes out smaller than the discrimination value. Signals with (ABS(CCC)) values falling below this discrimination value show weak signal correlation because even the random mock signal(s) have greater correlation.

In this example, the first and second measured signals are measured signals in the collection. In one embodiment, the processor retrieves a cross correlation coefficient between the first and second measured signals. In one embodiment, this correlation coefficient is retrieved from the matrix of cross correlation coefficient values. The processor then compares the correlation coefficient to the discrimination value to determine whether the correlation coefficient is smaller (that is, lesser in magnitude) than the discrimination value.

In one embodiment, the second signal is a signal in the collection of measured signals with which the first signal is most correlated. Thus, in one embodiment, the correlation coefficient between the first and second signals is the cross correlation coefficient between the first signal and a measured signal in the collection with which the first signal is most correlated. In one embodiment, the processor retrieves the matrix of cross correlation coefficient values. In one embodiment, the processor retrieves the correlation coefficients of the first signal with the other measured signals. The processor identifies the maximum (Max) magnitude (Abs or absolute value) of these cross correlation coefficients (CCC) (altogether, Max(ABS(CCC))). This Max(ABS(CCC)) is the correlation coefficient between the first signal and measured signal with which the first signal is most correlated. The processor then determines whether this Max(ABS(CCC)) is less than the discrimination value. A Max(ABS(CCC)) for the first signal that is less than the discrimination value indicates excessively weak correlation (or non-correlation) between the first signal and the other measured signals. The first signal therefore is not better correlated with the other measured signals any better than a random signal is correlated with the other measured signals.

In one embodiment, process blocks 225 (and 230, as discussed below) may be repeated in order to evaluate additional measured signals for eviction of the additional signal due to weak correlation. Thus, in one example, the processor identifies the maximum absolute value of the cross correlation coefficient (Max(ABS(CCC)) of more than one measured signal with other measured signals. For example, the processor identifies the Max(ABS(CCC)) for each measured signal with each other measured signal. The processor then compares the (Max(ABS(CCC)) of the measured signal with other measured signals to the discrimination value. The processor then determines whether or not the (Max(ABS (CCC)) is less than the discrimination value. Those signals with Max(ABS(CCC)) below the discrimination value are too weakly correlated.

Processing at process block 225 completes, and processing continues to process block 230. At the completion of process block 225, measured signal(s) that are so weakly correlated as to be undesirable for retention in the collection of signals have been identified. These may be undesirable for retention, for example, because they do not contribute to predictive ability of a model, such as a multivariate ML model. These measured signals may be evicted from the collection as discussed at process block 230.

At process block 230, the processor evicts the first measured signal from the collection of measured time series signals in response to the identification that the first measured signal has the weak signal correlation. In one embodiment the steps of process block 230 are performed by executing signal eviction module 178. Signals selected for eviction because their cross correlation coefficient with other signals is below cross correlation coefficient(s) for the random mock signal are too weakly correlated to be retained for a purpose of the collection of measured signals. For example, where the collection is a database of measured signals to be used for predictive modeling, that their removal strengthens multivariate ML models constructed from the signals database.

Eviction may mean actual removal or deletion from the signals database/collection, or tagging the signal (for example in signals database metadata) with an indication that it is unsuitable for inclusion in the multivariate ML model, or otherwise removing evicted signals from availability for inclusion in the multivariate ML model. In one embodiment, the processor labels the first signal (that is, the signal that has a Max(Abs(CCC)) lower than the discrimination value) in the signals database (for example, by populating a field or setting a flag) indicating that the signal should be excluded from use in multivariate prognostic models. Or, in one embodiment, the processor deletes the first signal from the signals database/collection. In one embodiment, the processor otherwise limits or eliminates access to the first signal in the signals database/collection. Processing at process block 230 then completes. At the completion of process block 230, the collection of signals has been pre-processed to evict signals that do not contribute to or even reduce the prognostic power of a multivariate ML model. The remaining, non-evicted signals in the collection may then be used in both training and surveillance (monitoring) operations of the multivariate model to realize improved prognostic accuracy and reduced compute overhead for the multivariate ML model.

Note that, in one embodiment, process blocks 225 and 230 may be repeated in order to evaluate additional measured signals for eviction of the additional signal due to weak correlation. In one embodiment, each additional measured signal in a set of additional signals is substituted in as the second signal, one-at-a-time. The processor (i) determines that an additional correlation coefficient between an additional signal and the first signal is smaller than the discrimination value (as discussed above with reference to process block 225); and (ii) evicts the additional signal from inclusion in a multivariate anomaly detection model in response to the determination that the additional correlation coefficient is smaller than the discrimination value (as discussed above with respect to process block 230). In one embodiment, the set of additional second signals is a selection of one or more (or all) of the #Sigs measured signals other than the second signal.

Thus, in one embodiment the correlation coefficient between any pair of measured signals in the collection may be compared with the discrimination value to determine whether a signal in the pair should be evicted. In one embodiment, eviction from (or retention in) an anomaly detection model is thus based on whether the first signal in the pair is more correlated with the second signal than a random signal is correlated with any measured signal in the collection. Once processing at process block 230 completes for the final time (whether repeated or not), processing continues to END block 235, where process 200 ends.

In one embodiment, the eviction algorithm inserts a random signal into a time series database of sensor signals. The random signal has the same number of observations as the sensor signals. The absolute value of CCC for the signals are calculated. A histogram of CCC values corresponding to the highest absolute value of the CCC for the random signal with other signals in the database is generated. The mean value of the histogram is calculated, and the mean value is used as an eviction discriminator threshold to determine whether a signal should be evicted from the database due to having insufficient cross correlation to justify inclusion in the ML model. This eviction discriminator threshold resolves the fuzziness of CCC ranking and provides greatly increased accuracy in discriminating correlated from uncorrelated signals. While a single pass through the algorithm above may realize the great improvement in accuracy, in one embodiment, multiple passes in which the random signal is replaced by a new random signal in the database in each pass continues to refine the accuracy of the eviction discriminator.

—Multi-Pass Derivation of Eviction Discriminator—

A single pass through the mock signal insertion—ABS (CCC) comparison—signal eviction steps produces satisfactory evictions of signals known to have no real correlation with the other signals in the measured database of signals. As the noisiness of the measured signals increases, making the cross correlation with other measured signals weaker and weaker, this simple "one pass with one mock (random) signal" method is more than 95% accurate in correct evictions of uncorrelated signals. This alone represents a significant improvement over the simple cut-off threshold approach, which may wrongly exclude over 50% of meaningfully correlated, but noisy signals in the fuzzy zone between about 0.2-0.5 ABS(CCC).

But, generating and inserting just one purely random mock signal is still subject to a probability of the random sequence of the mock signal accidentally appearing to be as well correlated as other measured (real) signals in the database. This is especially so where #Obs for the sequence is smaller, for example where #Obs is less than 100. To diminish the possibility of chance correlation between random and real signals to the point that it has no effect, and to create a highly-robust multi-pass empirical discriminator, the insertion of mock signal and generation of correlation coefficients between mock and measured signals may be repeated or looped.

At a pass through the loop, a new, different or distinct random mock signal is generated and inserted into the database, removing and replacing the previously inserted mock signal. The new mock signal also has the same #Obs, but with a different random "seed" that results in a signal that is still uncorrelated but with a different sequence of observations or values from the previous mock signal. The processor thus generates one or more additional mock signals of random values. The additional mock signals are generated to have a sequence of signal values unique among the mock signals. For the additional mock signals, the processor adds to, replaces or overwrites the current mock signal with the additional mock signal, one-at-a-time. Thus, a mock signal is replaced in the signal collection by a new mock signal, so that that there is a distinct mock signal used for each generation of a set of cross correlation coefficients between signals.

Note that the cross correlation coefficients between measured signals do not change with insertion of different signals. Therefore, the matrix of cross correlation coefficients need not be updated for correlations between the measured signals when an additional mock signal is inserted or otherwise used.

Also, for the additional mock signals, the processor generates mock correlation coefficients between the additional mock signal and the measured time series signals. In one embodiment, at the second and subsequent passes through the loop, a new set of mock CCCs between a measured (or "real") signal and the mock signal is generated. This loop may be repeated multiple times, for N mock signals. In one embodiment, for the individual mock signals, the processor identifies a maximum magnitude mock correlation coefficient between the mock signal and the measured time series signals. In one embodiment, in a pass through the loop, the processor stores the maximum magnitude (absolute value) of the cross correlation coefficients (Max(Abs (CCC))) for the mock signal, thus making the maximum magnitude mock correlation coefficient available. In one embodiment, the Max(Abs(CCC)) for the mock signal is stored along with the other #Sigs measured (or "real") signals, for example by addition of a row and column for the new mock signal to a matrix of cross correlation coefficients and population of the row and column with CCC values for the mock signal.

In one embodiment, the discrimination value selected is the average of the maximum cross correlation coefficients. In one embodiment, the processor finds an average based on the maximum magnitude mock cross correlation coefficients. In one embodiment, a histogram of the Max(Abs (CCC)) for more than one (or each) pass through the loop is generated. The mean of the histogram, Mean of the Max (ABS(CCC)), is calculated, and used as the eviction discriminator for the collection/database of signals. In this way, the processor generates a histogram of the maximum magnitude correlation coefficients; and finds the mean of the histogram; wherein the average based on the maximum magnitude cross correlation coefficients is the mean of the histogram.

In one embodiment, at a pass through a loop from N=1 to 20 distinct mock (random) signals, the processor computes a full (#Sig+1)×(#Sig+1) CCC matrix, identifies the maximum absolute value (or magnitude) of the mock cross correlation coefficient (Max(Abs(CCC)) in the mock signal, and stores the identified Max(Abs(CCC), for example in a data structure associated with the signal database. The processor then finds the mean of the stored maximum absolute value of mock cross correlation coefficient for N mock signals (Mean(Max(Abs(CCC)))).

Exhaustive experimental replications of this process shows that the Max(Abs(CCC)) values create a very narrow histogram with a very stable mean value. In one embodiment, for conservatism, the loop is repeated 20 times, generating a histogram of Max(Abs(CCC)) values for each of 20 distinct mock signals with the real measured signals. Use of 20 values very reliably creates a tight histogram for which the Mean of the Max(Abs(CCC)) reaches a stable asymptote that does not vary in the 4th decimal place. The generated Mean of the Max(ABS(CCC)) is a very robust eviction discriminator or threshold for preprocessing any collection of user signals for eviction of those that are not really correlated with the others.

In one example, the mock signals are inserted into the signals database one at a time. In one example, the individual mock signals have random value sequences distinct from the value sequences of the other mock signals. In one example, the mock signals replace the previously generated mock signal in turn. In one embodiment, the previously generated mock signal is replaced by making a newly generated mock signal accessible in place of or in addition to the previously generated mock signal. In one embodiment, the replacement of mock signals puts the new mock signal into the database into the database. In one embodiment, the previously inserted mock signal is overwritten so that the size of the collection of signals in the database is #Sigs+1.

As verified by experimentation, an eviction discriminator generated in this way performs far better than putting a fixed threshold on the large #Sigs×#Sigs array of CCCs. Evicting uncorrelated signals from a database on the basis of an eviction discriminator generated as shown and described herein may yield superior performance for a multivariate regression-based ML anomaly detection core kernel, such as implementations of Neural Nets (NNs), Support Vector Machines (SVMs), Kernel Regression (KR), Multivariate State Estimation Technique (MSET), and even simple Linear Regression (LR). In this way, a total number of mock signals for which a maximum magnitude correlation coefficient between the mock signal and the measured time series signals either (i) is at least twenty or (ii) causes the mean of the maximum magnitude correlation coefficients to not vary in the fourth decimal place.

In one embodiment, the processor is configured to evict signals in the collection of measured time series signals that have a maximum correlation coefficient with any other signal in the collection of measured time signals that indicates weaker or poorer correlation than the discrimination value of the mock signal(s); train the multivariate anomaly detection model using signals selected from remaining, non-evicted signals in the collection of measured time series signals, and not using evicted signals; and monitor the selected, non-evicted signals with the trained multivariate anomaly detection model to detect anomalies. In one embodiment, the processor identifies signals in the cross correlation coefficient matrix that have a maximum absolute value of cross correlation coefficient that is similarly or less correlated (e.g., smaller/lower value) than the discrimination value generated from the mock signal. The correlation coefficient smaller than the discrimination value indicates weaker or poorer correlation than a level of correlation indicated by the discrimination value of the mock signal. In one embodiment, the processor labels those signals with weaker correlation than the discrimination value in the signal database as evicted. In one embodiment, the processor configures the multivariate anomaly detection model to execute an objective function that outputs expected (or predicted) values of the input signals, given the actual (or observed) values of the input signals. The processor iteratively optimizes the objective function to correctly predict signal values, given the signals database from which signals have been evicted. The trained ML model is then stored for subsequent use to monitor the non-evicted signals of the collection of signals. In one embodiment, the processor monitors the non-evicted signals in the collection of signals by comparing the predicted signal values to observed signal values, and alerting where the difference or residual between the values are too great.

For signals in a database of time series that have little or no correlation with other signals, those may be separated out and analyzed by various univariate anomaly detection algorithms. In one embodiment, the processor is configured to include evicted signals (such as the second signal described in method 200 above) in a univariate anomaly detection model in response to the identification that the first measured signal has weak signal correlation. For example, where higher absolute value of correlation coefficient indicates stronger or greater correlation, the evicted signals may be included in the univariate anomaly detection model in response to the determination that the correlation coefficient of the evicted signal (such as the second correlation coefficient described in method 200 above) is smaller than the discrimination value. In one embodiment, the evicted signal may be tagged as "Univariate" in the signals database by setting a flag or variable associated with the evicted signal, and is dropped from the multivariate training, but included in univariate model training.

—Experimental Validation—

There exists a range from about 0.2-0.5 of absolute CCC values in which prior processes fail to discriminate between correlated and uncorrelated signals. Processes that are known by application of physics to have no actual correlation with one another may yet have a substantial CCC. For example, external signals that are known to come from some other machine, in some other building, and on a different date clearly do not have meaningful correlation, and yet might come out with a CCC of 0.45. Inclusion of this non-correlated signal in an anomaly detection ML model will drag down the prognostic power of the model by diluting the influence of whatever signals really are casuistically correlated.

Conversely, datasets that are known by application of physics to be related and which have a high measurement noise content from the stochastics of the process being monitored, may have a lower CCC. For example, noisy signals may have CCCs below 0.1, and may yet be desirable to include in the model because they nevertheless contribute some information content. It negatively affects the performance of an anomaly detection ML model to drop these noisy, but meaningfully correlated signals in favor of uncorrelated signals with higher CCC values. Retention of the noisy, but meaningfully correlated signals is especially valuable where the overall model is weak, and would benefit from the additional information contributed by the noisy signals.

Extensive experimentation with known ground truth correlation content in many datasets that have variable numbers of signals, variable sampling rates, and/or variable degrees of ground-truth deterministic dynamic content upon which simulated measurement noise is imposed has been performed for the eviction method described herein. The simulated measurement noise ranged from tiny noise ratios, representing highly accurate transducers monitoring processes with little stochastic variability, to very high noise ratios, representing low-resolution sensors monitoring processes with high stochastic variability. This experimentation has demonstrated across the space of combinations of strongly to weakly correlated signals that the novel approach for eviction of weakly correlated signals from multivariate anomaly detection models presented herein yields a substantially more robust eviction discriminator than fixed-threshold methods.

To demonstrate the effectiveness of the systems, methods, and other embodiments disclosed herein for eviction of weakly correlated signals from multivariate anomaly detection models, a set of demonstration datasets are created in which signals are known—as a ground truth, actual situation, established by factual knowledge—to have underlying correlation content. For example, the signals in a demonstration dataset may be known at a ground truth level to include correlated content because they are created—using a signal synthesizer—to have such correlation. Serially correlated—that is, per-signal correlation—and cross correlated components may be encoded into the signal by the signal synthesizer. These datasets are generated to span the gamut from small, medium, and larger databases of signals, and ranging from extremely high cross-correlation structure—as one would expect in asset monitoring with highly accurate transducers/sensors—to very poor cross-correlation content where the known correlated dynamics are buried in high noise ratios—representing low-resolution sensors monitoring processes with high stochastic variability. The systems, methods, and other embodiments disclosed herein for eviction of weakly correlated signals from multivariate anomaly detection models have been demonstrated experimentally to yield a substantially more robust eviction discriminator than fixed-threshold methods for the full range of combinations of strongly to weakly correlated signals.

The effectiveness of the systems, methods, and other embodiments disclosed herein for eviction of weakly correlated signals from multivariate anomaly detection models have are demonstrated herein with some datasets of example signals: a small, five signal dataset with low noise, a small, five signal dataset with high noise, a medium, ten signal dataset with low noise, a medium, ten signal dataset with high noise, a large, twenty signal dataset with low noise, and a large, twenty signal dataset with high noise. While the size of these datasets may all seem "small" when compared with the multi-thousand signal datasets that can occur in current sensor-monitored systems, these datasets are presented on an order of magnitude at which their improved performance may be compared with fixed-threshold methods. It is impossible to perform the analysis used to select a fixed-threshold at the multi-thousand signal level. Use of the signal datasets here demonstrates that the systems, methods, and other embodiments disclosed herein both (i) improve the accuracy and performance over fixed-threshold methods, especially where signals come from inaccurate sensors, are noisy, or have only weak intercorrelation; and (ii) scale with increases in signal count. While the experimentation described herein is scaled from 5-20 signals in the dataset (for convenience of inclusion within this document), there is nothing in the algorithm that breaks down when applied to hundreds, thousands, or even millions of signals.

The experimental examples described herein for high-accuracy, low-noise, good-correlation use cases (the "low noise" examples below), the "mean of histogram" eviction discriminator values are generally lower than or equal to the CCC values of the cells in the CCC matrix. Moreover, the "mean of histogram" eviction discriminator values are generally distant from the CCC values of low noise signals, and therefore present little danger of accidentally tossing out correlated signals. The undesirable (and potentially dangerous) exclusion of correlated signals from a multivariate ML model is possible with fixed-threshold signal eviction, but is avoided with the eviction systems and methods disclosed herein. The experimental examples described herein for the more challenging use cases (the "high noise" examples below) show that even with high noise and/or weakly correlated signals, in 99.9% of use cases, the systems, methods, and other embodiments disclosed herein for eviction of weakly correlated signals from multivariate anomaly detection models does not evict signals that should have been left in the ML Model.

—Experimental Validation—Small Signal Group with Low Signal Noise—

Figure 3:
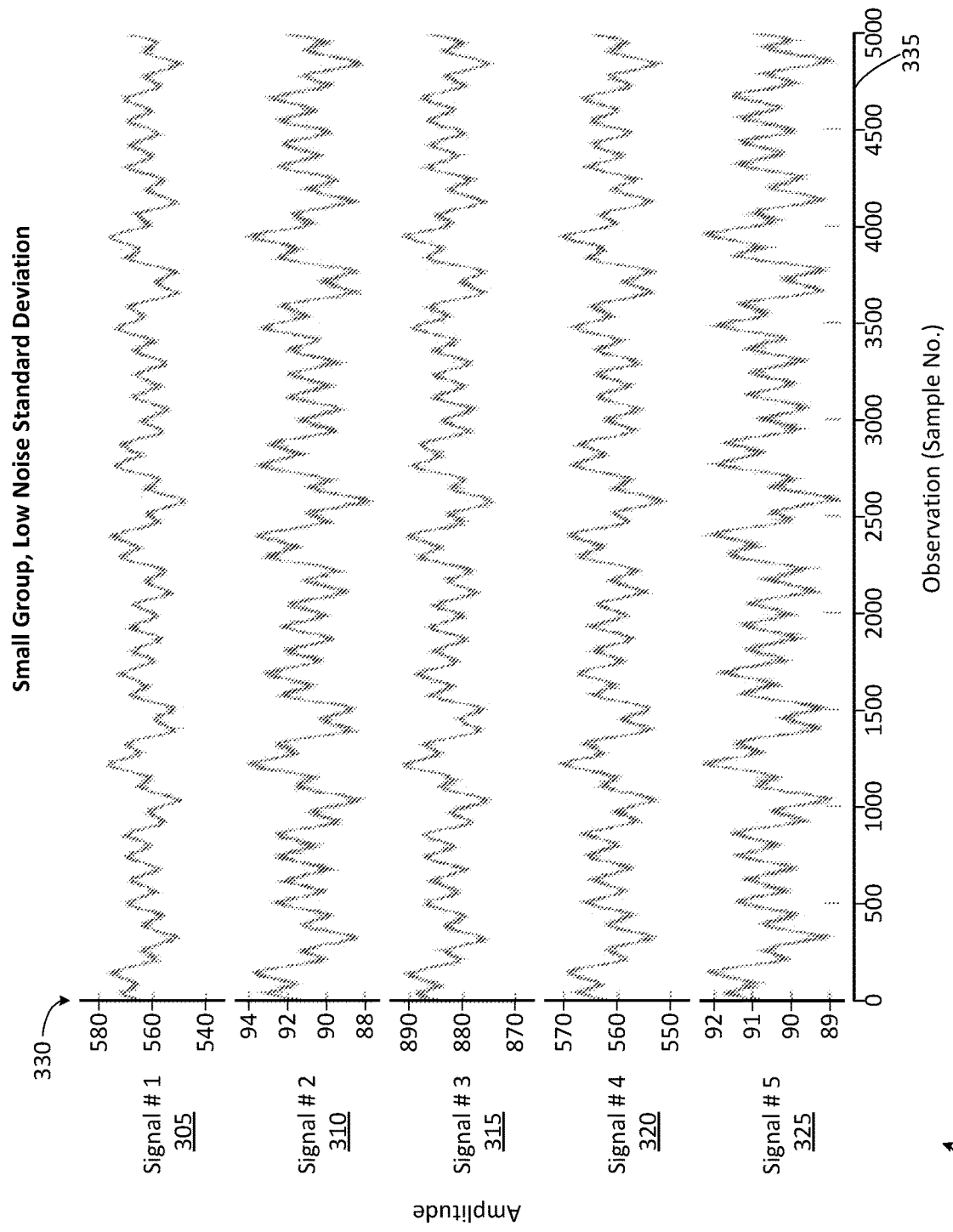
FIG. 3 illustrates a plot of an example small group of five signals synthesized with a low standard deviation for noise, in one embodiment.

FIG. 3 illustrates a plot 300 of an example small group of five signals synthesized with a low standard deviation (which may be represented herein by $\sigma$) for noise. Example low noise signals Signal #1 305, Signal #2 310, Signal #3 315, Signal #4 320, and Signal #5 325 are each plotted against an amplitude axis 330 (shown in axis segments individually scaled with respect to the associated signal) and an observation or sample number axis 335. The number of observations (#Obs) or length of the time series for the example low noise signals is 5000 observations or samples. Visual comparison of the signals shows clear correlation between the five signals. This is borne out by review of the cross correlation coefficient matrix generated for the five signals (shown in TABLE 1 below), in which each signal correlates with each other signal with a correlation coefficient of over 95%.

A matrix of cross correlation coefficient values may be generated that shows the correlation coefficient for each signal with each other signal, forming a matrix of dimension #Sigs×#Sigs. The cross correlation coefficient matrix may show the cross correlations for each signal by rank, showing a signal with greatest correlation coefficient in a first rank, a signal with the next greatest correlation coefficient in a second rank, and so on, until ranks are filled. This ranked presentation of a cross correlation coefficient matrix is useful for clearly showing which signals have the greatest correlation coefficient with other signals. Alternatively, the cross correlation coefficient matrix may simply show a correlation coefficient for a first signal and a second signal in a cell of the matrix where a row associated with the first signal and a column associated with the second signal intersect. This unranked presentation of a cross correlation coefficient matrix is useful for locating the correlation coefficient between two particular signals, but does not present the correlation coefficients in ranked order. The cross correlation coefficient matrices shown in the following tables are presented in ranked format, to allow for quick identification of a most correlated signal for a given signal.

TABLE 1 shows a cross correlation coefficient matrix generated for example low noise signals Signal #1 305, Signal #2 310, Signal #3 315, Signal #4 320, and Signal #5 325.

TABLE 1

Low Noise $\sigma$ Cross Correlation Coefficient Matrix

|  | Rank 1 | Rank 2 | Rank 3 | Rank 4 | Rank 5 |
|---|---|---|---|---|---|
| Sig. # 1 CC | Sig. # 1 1 | Sig. # 4 0.9596 | Sig. # 3 0.9592 | Sig. # 5 0.9586 | Sig. # 2 0.9584 |
| Sig. # 2 CC | Sig. # 2 1 | Sig. # 4 0.9614 | Sig. # 3 0.9606 | Sig. # 5 0.9589 | Sig. # 1 0.9584 |
| Sig. # 3 CC | Sig. # 3 1 | Sig. # 4 0.9619 | Sig. # 2 0.9606 | Sig. # 5 0.9600 | Sig. # 1 0.9592 |
| Sig. # 4 CC | Sig. # 4 1 | Sig. # 3 0.9619 | Sig. # 2 0.9614 | Sig. # 5 0.9605 | Sig. # 1 0.9596 |
| Sig. # 5 CC | Sig. # 5 1 | Sig. # 4 0.9605 | Sig. # 3 0.9600 | Sig. # 2 0.9589 | Sig. # 1 0.9586 |

As can be seen from TABLE 1, the five example low noise signals are highly correlated. The eviction discriminator value generated by the systems, methods, and other embodiments for eviction of weakly correlated signals from multivariate anomaly detection models does not exclude any of these signals from inclusion in a multivariate ML model.

—Experimental Validation—Small Signal Group with High Signal Noise—

Figure 4:
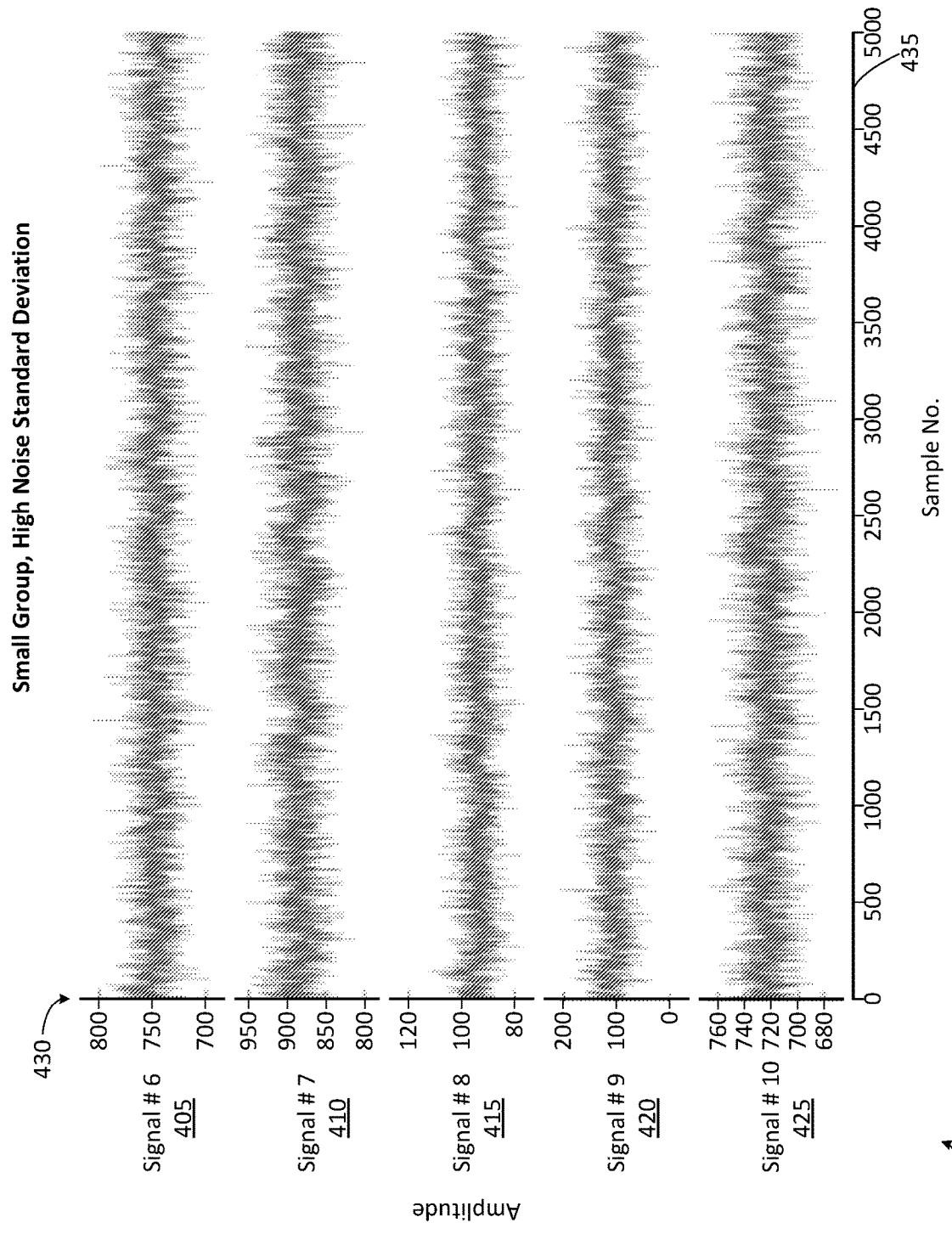
FIG. 4 illustrates a plot of an example small group of five signals synthesized with a high standard deviation for noise, in one embodiment.

FIG. 4 illustrates a plot 400 of an example small group of five signals synthesized with a high standard deviation for noise. Example high noise signals Signal #6 405, Signal #7 410, Signal #8 415, Signal #9 420, and Signal #10 425 are each plotted against an amplitude axis 430 (shown in axis segments individually scaled with respect to the associated signal) and an observation or sample number axis 435. The number of observations (#Obs) or length of the time series for the example low noise signals is 5000 observations or samples. Visual comparison of the signals does not readily reveal correlation between the example high noise signals.

TABLE 2 shows a cross correlation coefficient matrix generated for example high noise signals Signal #6 405, Signal #7 410, Signal #8 415, Signal #9 420, and Signal #10 425.

TABLE 2

High Noise σ Cross Correlation Coefficient Matrix

|  | Rank 1 | Rank 2 | Rank 3 | Rank 4 | Rank 5 |
|---|---|---|---|---|---|
| Sig. # 6 CC | Sig. # 6 1 | Sig. # 7 0.0607 | Sig. # 9 0.0572 | Sig. # 10 0.0484 | Sig. # 8 0.0447 |
| Sig. # 7 CC | Sig. # 7 1 | Sig. # 10 0.0783 | Sig. # 8 0.0729 | Sig. # 6 0.0607 | Sig. # 9 0.0522 |
| Sig. # 8 CC | Sig. # 8 1 | Sig. # 7 0.0729 | Sig. # 10 0.0651 | Sig. # 9 0.0651 | Sig. # 6 0.0447 |
| Sig. # 9 CC | Sig. # 9 1 | Sig. # 8 0.0651 | Sig. # 6 0.0522 | Sig. # 7 0.0522 | Sig. # 10 0.0477 |
| Sig. # 10 CC | Sig. # 10 1 | Sig. # 7 0.0783 | Sig. # 8 0.0651 | Sig. # 6 0.0484 | Sig. # 9 0.0477 |

TABLE 2 confirms that the five example high noise signals are only very weakly correlated with each other: no signal correlates with any other signal with a correlation coefficient over 8%. But, these example high noise signals are synthesized with actual, ground truth correlation that is not evident from either analysis of the signal waveforms shown in plot 400 or review of the cross correlation matrix in TABLE 2. The correlation of the signals is masked by the high noise level of the signals. The eviction discriminator value generated by the eviction systems and methods described herein will capture even this very weak or hidden correlation. Thus, these signals are not excluded from inclusion in a multivariate ML model. The eviction discriminator generated as shown and described herein will retain and not evict or exclude these high noise signals even when included in a database with low noise signals, such as those discussed above with reference to FIG. 3 and TABLE 1. By contrast, a fixed threshold approach to signal eviction would exclude all of these high noise example signals.

—Experimental Validation—Medium Signal Group with Low Signal Noise—

Figure 5:
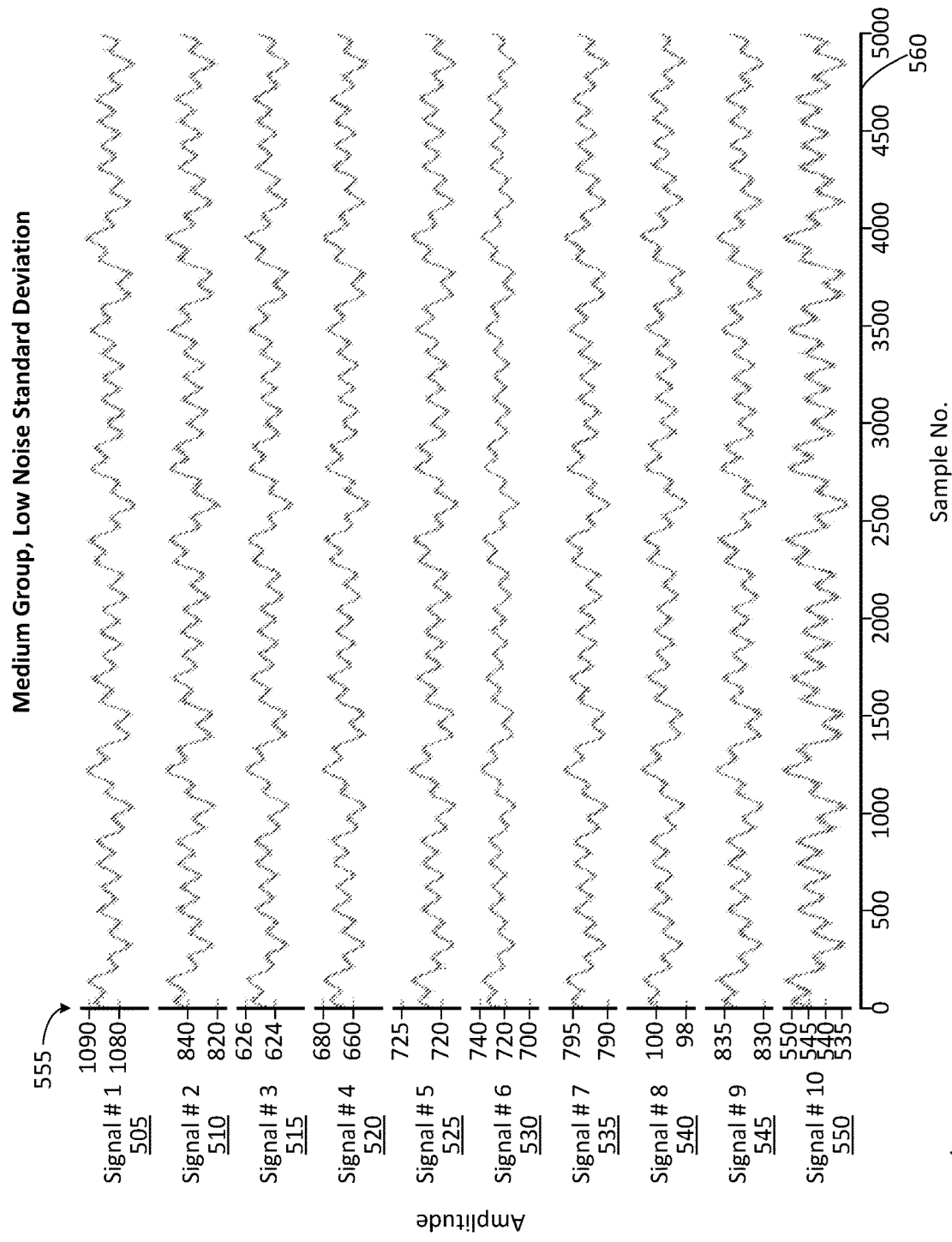
FIG. 5 illustrates a plot of an example medium group of ten signals synthesized with a low standard deviation for noise, in one embodiment.

FIG. 5 illustrates a plot 500 of an example medium group of ten signals synthesized with a low standard deviation for noise. Example low noise signals Signal #1 505, Signal #2 510, Signal #3 515, Signal #4 520, Signal #5 525, Signal #6 530, Signal #7 535, Signal #8 540, Signal #9 545, and Signal #10 550 are each plotted against an amplitude axis 555 (shown in axis segments individually scaled with respect to the associated signal) and an observation or sample number axis 560. The number of observations (#Obs) or length of the time series for the example low noise signals is 5000 observations or samples. Visual comparison of the ten example low noise signals shows clear correlation between the ten signals.

TABLE 3 shows a cross correlation coefficient matrix generated for example low noise signals Signal #1 505, Signal #2 510, Signal #3 515, Signal #4 520, Signal #5 525, Signal #6 530, Signal #7 535, Signal #8 540, Signal #9 545, and Signal #10 550.

TABLE 3

Low Noise σ Cross Correlation Coefficient Matrix

|  | Rank 1 | Rank 2 | Rank 3 | Rank 4 | Rank 5 | Rank 6 | Rank 7 | Rank 8 | Rank 9 | Rank 10 |
|---|---|---|---|---|---|---|---|---|---|---|
| Sig. # 1 CC | Sig. # 1 1 | Sig. # 5 0.9603 | Sig. # 3 0.9602 | Sig. # 7 0.9597 | Sig. # 2 0.9596 | Sig. # 4 0.9596 | Sig. # 10 0.9592 | Sig. # 8 0.9590 | Sig. # 6 0.9588 | Sig. # 9 0.9584 |
| Sig. # 2 CC | Sig. # 2 1 | Sig. # 5 0.9602 | Sig. # 4 0.9598 | Sig. # 10 0.9597 | Sig. # 1 0.9596 | Sig. # 8 0.9596 | Sig. # 3 0.9594 | Sig. # 6 0.9590 | Sig. # 7 0.9590 | Sig. # 9 0.9585 |
| Sig. # 3 CC | Sig. # 3 1 | Sig. # 1 0.9602 | Sig. # 2 0.9594 | Sig. # 4 0.9592 | Sig. # 5 0.9584 | Sig. # 8 0.9581 | Sig. # 9 0.9581 | Sig. # 10 0.9580 | Sig. # 6 0.9576 | Sig. # 7 0.9573 |
| Sig. # 4 CC | Sig. # 4 1 | Sig. # 2 0.9598 | Sig. # 1 0.9596 | Sig. # 5 0.9594 | Sig. # 3 0.9592 | Sig. # 9 0.9591 | Sig. # 8 0.9583 | Sig. # 10 0.9581 | Sig. # 6 0.9578 | Sig. # 7 0.9574 |
| Sig. # 5 CC | Sig. # 5 1 | Sig. # 1 0.9603 | Sig. # 2 0.9602 | Sig. # 7 0.9597 | Sig. # 9 0.9595 | Sig. # 4 0.9594 | Sig. # 8 0.9593 | Sig. # 10 0.9587 | Sig. # 6 0.9585 | Sig. # 3 0.9584 |
| Sig. # 6 CC | Sig. # 6 1 | Sig. # 2 0.9590 | Sig. # 1 0.9588 | Sig. # 9 0.9588 | Sig. # 5 0.9585 | Sig. # 10 0.9581 | Sig. # 4 0.9578 | Sig. # 7 0.9578 | Sig. # 8 0.9577 | Sig. # 3 0.9576 |
| Sig. # 7 CC | Sig. # 7 1 | Sig. # 5 0.9597 | Sig. # 1 0.9597 | Sig. # 2 0.9590 | Sig. # 6 0.9578 | Sig. # 9 0.9577 | Sig. # 4 0.9574 | Sig. # 10 0.9574 | Sig. # 3 0.9573 | Sig. # 8 0.9573 |
| Sig. # 8 CC | Sig. # 8 1 | Sig. # 2 0.9596 | Sig. # 5 0.9593 | Sig. # 1 0.9590 | Sig. # 10 0.9583 | Sig. # 4 0.9583 | Sig. # 3 0.9581 | Sig. # 9 0.9581 | Sig. # 6 0.9577 | Sig. # 7 0.9573 |
| Sig. # 9 CC | Sig. # 9 1 | Sig. # 5 0.9595 | Sig. # 4 0.9591 | Sig. # 6 0.9588 | Sig. # 2 0.9585 | Sig. # 1 0.9584 | Sig. # 3 0.9581 | Sig. # 8 0.9581 | Sig. # 10 0.9581 | Sig. # 7 0.9577 |
| Sig. # 10 CC | Sig. # 10 1 | Sig. # 2 0.9597 | Sig. # 1 0.9592 | Sig. # 5 0.9587 | Sig. # 8 0.9583 | Sig. # 9 0.9581 | Sig. # 4 0.9581 | Sig. # 6 0.9581 | Sig. # 3 0.9580 | Sig. # 7 0.9574 |

As can be seen from TABLE 3, the five example low noise signals are highly correlated: each signal correlates with each other signal with a correlation coefficient of over 95%. The eviction discriminator value generated by the systems, methods, and other embodiments for eviction of weakly correlated signals from multivariate anomaly detection models does not exclude any of these signals from inclusion in a multivariate ML model, and thus scales to this larger dataset of signals without loss in accuracy or performance.

—Experimental Validation—Medium Signal Group with High Signal Noise—

Figure 6:
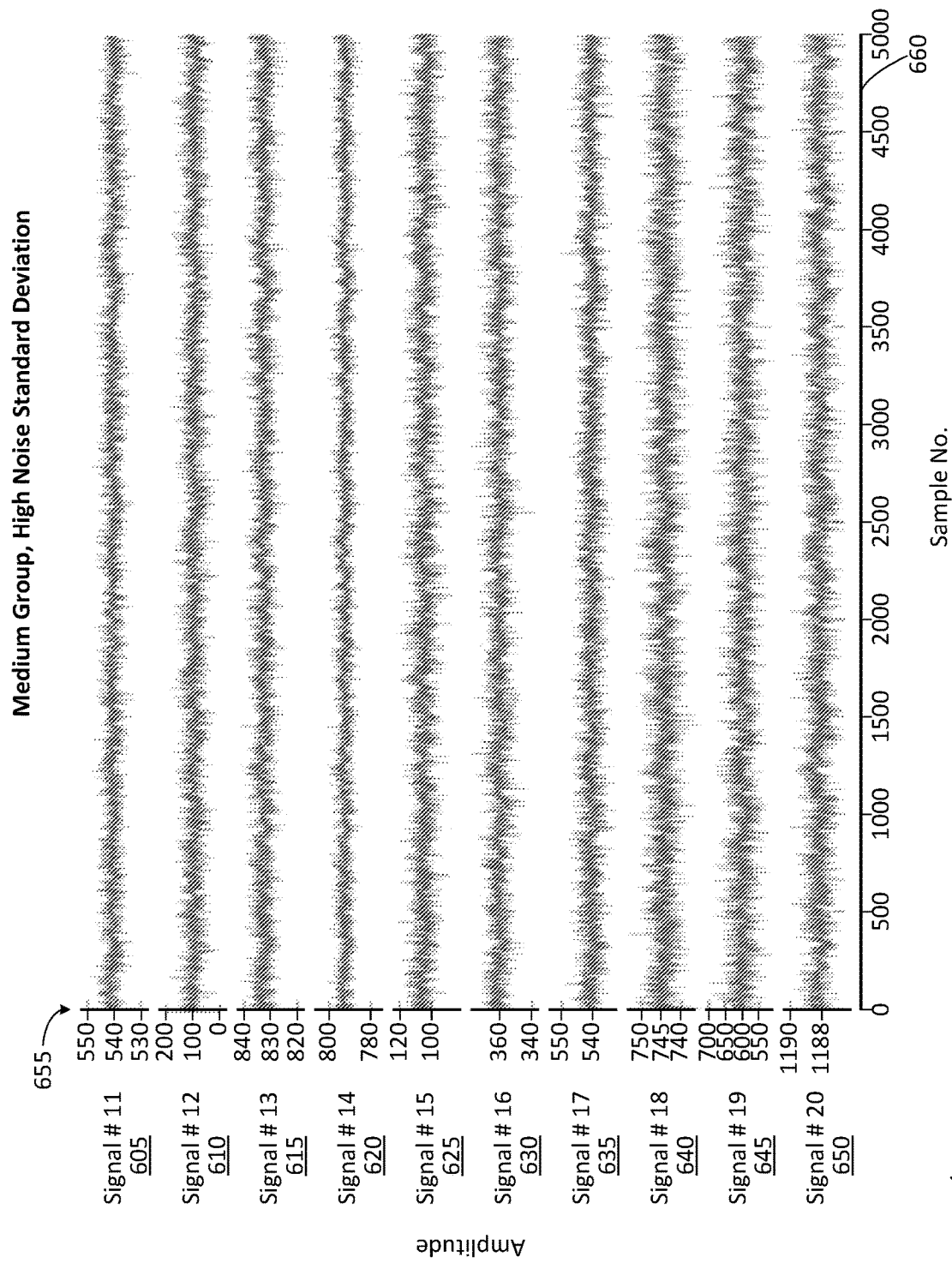
FIG. 6 illustrates a plot of an example medium group of ten signals synthesized with a high standard deviation for noise, in one embodiment.

FIG. 6 illustrates a plot 600 of an example medium group of ten signals synthesized with a high standard deviation for noise. Example low noise signals Signal #11 605, Signal #12 610, Signal #13 615, Signal #14 620, Signal #15 625, Signal #16 630, Signal #17 635, Signal #18 640, Signal #19 645, and Signal #20 650 are each plotted against an amplitude axis 655 (shown in axis segments individually scaled with respect to the associated signal) and an observation or sample number axis 660. The number of observations (#Obs) or length of the time series for the example low noise signals is 5000 observations or samples. Visual comparison of the ten example high noise signals does not readily reveal correlation between the example high noise signals.

TABLE 4 shows a cross correlation coefficient matrix generated for example high noise signals Signal #11 605, Signal #12 610, Signal #13 615, Signal #14 620, Signal #15 625, Signal #16 630, Signal #17 635, Signal #18 640, Signal #19 645, and Signal #20 650.

actually correlated signals, removing their information content from a multivariate ML model. The eviction discriminator value generated by the eviction systems and methods described herein will capture even this very weak or hidden correlation, and does not exclude these signals from inclusion in a multivariate ML model. The eviction discriminator generated as shown and described herein will retain and not evict or exclude these high noise signals even when included in a database with low noise signals, such as those discussed above with reference to FIG. 5 and TABLE 3. The eviction discriminator as generated by the systems, methods, and other embodiments described herein thus scales to this larger dataset of signals without loss in accuracy or performance.

—Experimental Validation—Large Signal Group with Low Signal Noise—

Figure 7A:
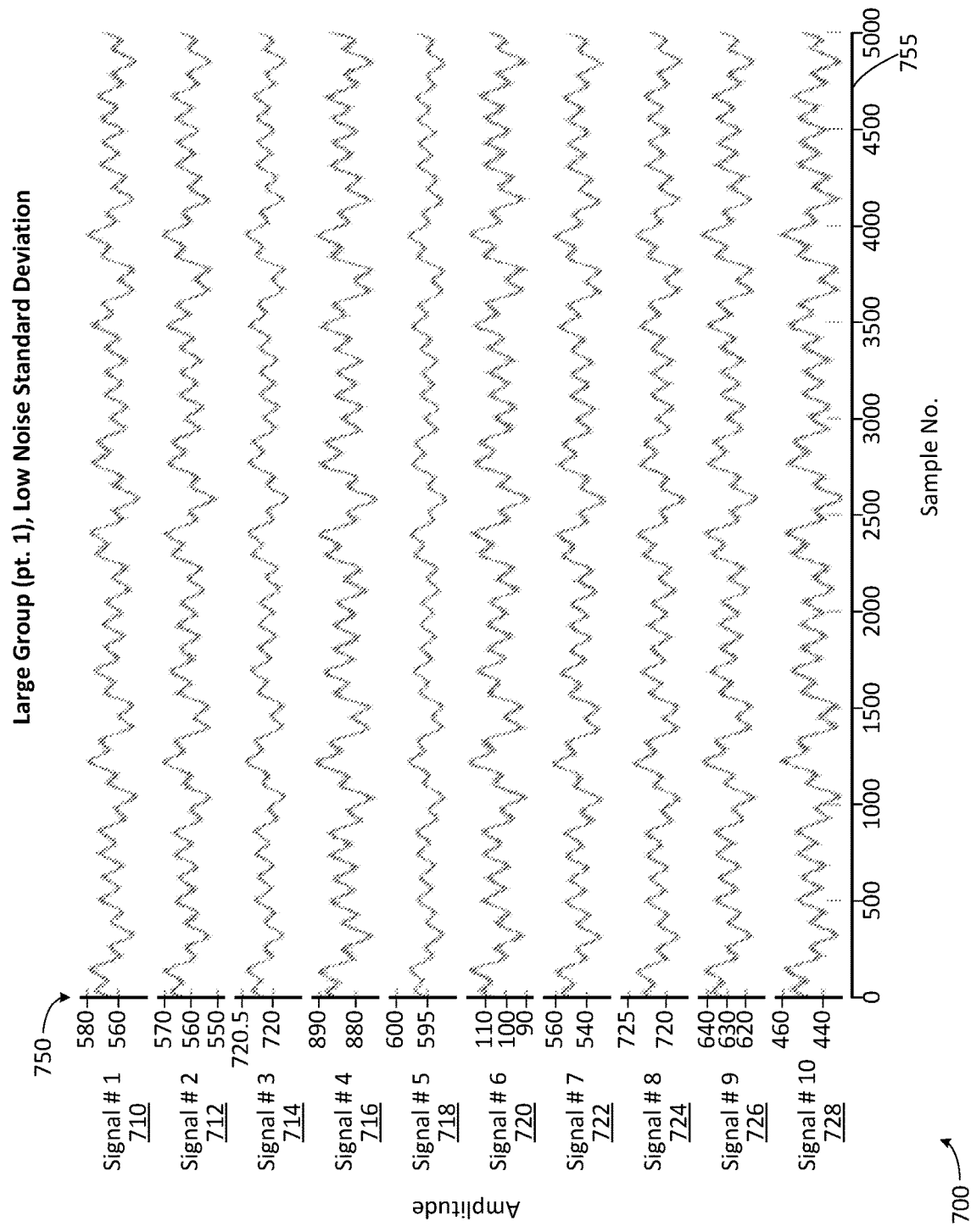
FIG. 7A illustrates a plot of a first ten signals of an example large group of twenty signals synthesized with a low standard deviation for noise, in one embodiment.
Figure 7B:
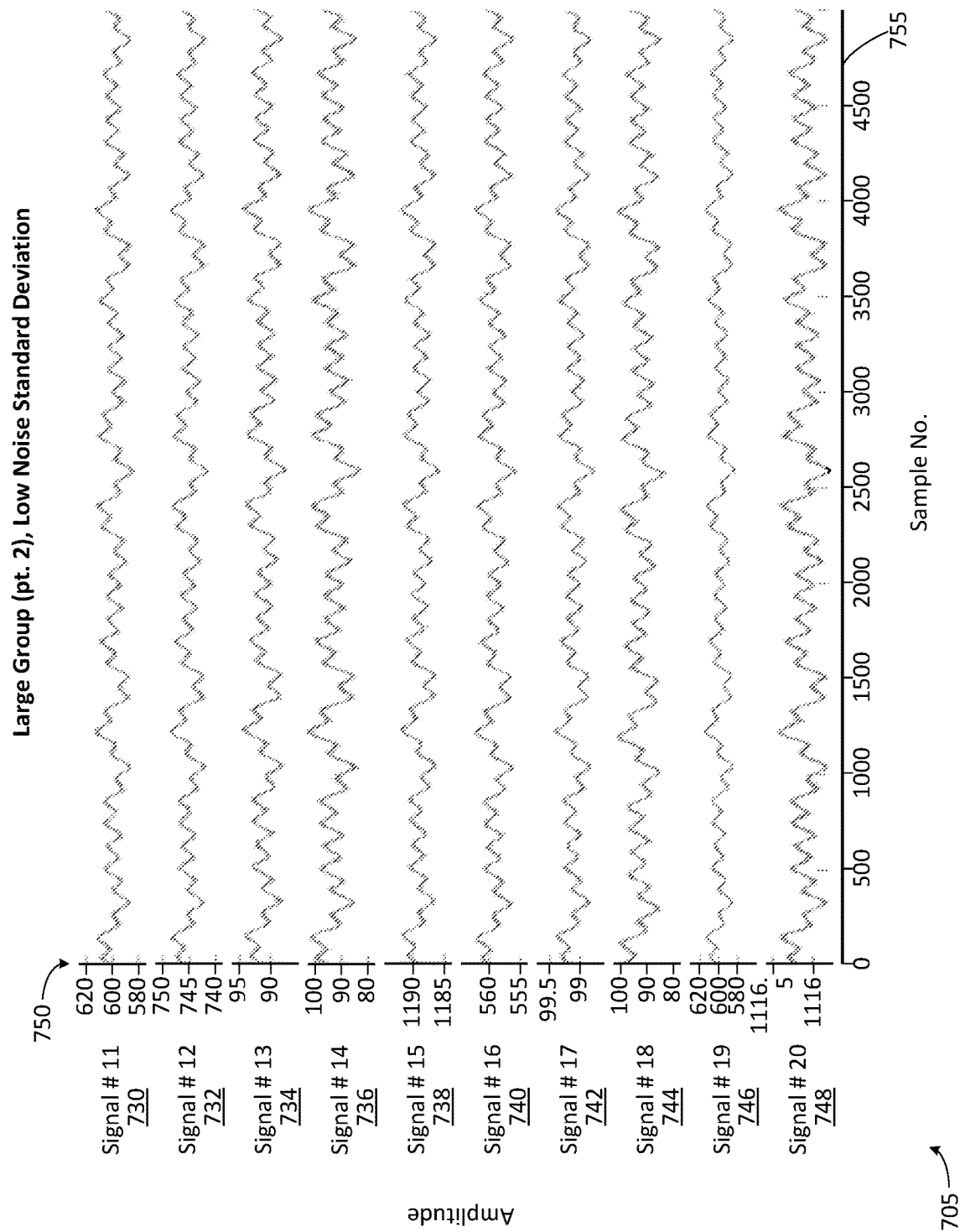
FIG. 7B illustrates a plot of a second ten signals of the example large group of twenty signals, in one embodiment.

FIG. 7A illustrates a plot 700 of the first ten signals of an example large group of twenty signals synthesized with a low standard deviation for noise, and FIG. 7B illustrates a plot 705 of the second ten signals of the example large group of twenty signals. Example low noise signals Signal #1 710, Signal #2 712, Signal #3 714, Signal #4 716, Signal #5 718, Signal #6 720, Signal #7 722, Signal #8 724, Signal #9 726, Signal #10 728, Signal #11 730, Signal #12 732, Signal #13 734, Signal #14 736, Signal #15 738, Signal #16 740, Signal #17 742, Signal #18 744, Signal #19 746, and Signal #20 748 are each plotted against an amplitude axis 750 (shown in axis segments individually scaled with respect to the associated signal) and an observation or sample number axis 755. The number of observations (#Obs) or length of the

TABLE 4

High Noise σ Cross Correlation Coefficient Matrix

| | Rank 1 | Rank 2 | Rank 3 | Rank 4 | Rank 5 | Rank 6 | Rank 7 | Rank 8 | Rank 9 | Rank 10 |
|---|---|---|---|---|---|---|---|---|---|---|
| Sig. # 11 | Sig. # 11 | Sig. # 13 | Sig. # 17 | Sig. # 12 | Sig. # 14 | Sig. # 18 | Sig. # 15 | Sig. # 16 | Sig. # 20 | Sig. # 19 |
| CC | 1 | 0.0810 | 0.0967 | 0.0646 | 0.0570 | 0.0520 | 0.0487 | 0.0453 | 0.0433 | 0.0344 |
| Sig. # 12 | Sig. # 12 | Sig. # 11 | Sig. # 17 | Sig. # 20 | Sig. # 13 | Sig. # 19 | Sig. # 14 | Sig. # 16 | Sig. # 15 | Sig. # 18 |
| CC | 1 | 0.0646 | 0.0624 | 0.0609 | 0.0592 | 0.0464 | 0.0396 | 0.0393 | 0.0365 | 0.0316 |
| Sig. # 13 | Sig. # 13 | Sig. # 11 | Sig. # 18 | Sig. # 16 | Sig. # 14 | Sig. # 12 | Sig. # 20 | Sig. # 15 | Sig. # 19 | Sig. # 17 |
| CC | 1 | 0.0810 | 0.0732 | 0.0662 | 0.0647 | 0.0592 | 0.0582 | 0.0533 | 0.0486 | 0.0464 |
| Sig. # 14 | Sig. # 14 | Sig. # 18 | Sig. # 20 | Sig. # 13 | Sig. # 17 | Sig. # 11 | Sig. # 15 | Sig. # 16 | Sig. # 19 | Sig. # 12 |
| CC | 1 | 0.0799 | 0.0709 | 0.0647 | 0.0637 | 0.0570 | 0.0504 | 0.0458 | 0.0439 | 0.0396 |
| Sig. # 15 | Sig. # 15 | Sig. # 20 | Sig. # 18 | Sig. # 16 | Sig. # 13 | Sig. # 19 | Sig. # 14 | Sig. # 11 | Sig. # 12 | Sig. # 17 |
| CC | 1 | 0.0616 | 0.0582 | 0.0537 | 0.0533 | 0.0519 | 0.0504 | 0.0487 | 0.0365 | 0.0297 |
| Sig. # 16 | Sig. # 16 | Sig. # 13 | Sig. # 17 | Sig. # 15 | Sig. # 19 | Sig. # 20 | Sig. # 14 | Sig. # 11 | Sig. # 12 | Sig. # 18 |
| CC | 1 | 0.0662 | 0.0551 | 0.0537 | 0.0535 | 0.0533 | 0.0458 | 0.0453 | 0.0393 | 0.0231 |
| Sig. # 17 | Sig. # 17 | Sig. # 11 | Sig. # 14 | Sig. # 12 | Sig. # 16 | Sig. # 20 | Sig. # 13 | Sig. # 19 | Sig. # 18 | Sig. # 15 |
| CC | 1 | 0.0697 | 0.0637 | 0.0624 | 0.0551 | 0.0545 | 0.0464 | 0.0441 | 0.0406 | 0.0297 |
| Sig. # 18 | Sig. # 18 | Sig. # 14 | Sig. # 13 | Sig. # 15 | Sig. # 20 | Sig. # 11 | Sig. # 17 | Sig. # 19 | Sig. # 12 | Sig. # 16 |
| CC | 1 | 0.0799 | 0.0732 | 0.0582 | 0.0581 | 0.0520 | 0.0406 | 0.0352 | 0.0316 | 0.0231 |
| Sig. # 19 | Sig. # 19 | Sig. # 16 | Sig. # 15 | Sig. # 13 | Sig. # 12 | Sig. # 20 | Sig. # 17 | Sig. # 14 | Sig. # 18 | Sig. # 11 |
| CC | 1 | 0.0535 | 0.0519 | 0.0486 | 0.0464 | 0.0446 | 0.0441 | 0.0439 | 0.0352 | 0.0344 |
| Sig. # 20 | Sig. # 20 | Sig. # 14 | Sig. # 15 | Sig. # 12 | Sig. # 13 | Sig. # 18 | Sig. # 17 | Sig. # 16 | Sig. # 19 | Sig. # 11 |
| CC | 1 | 0.0709 | 0.0616 | 0.0609 | 0.0582 | 0.0581 | 0.0545 | 0.0533 | 0.0446 | 0.0433 |

TABLE 4 confirms that the 10 example high noise signals are only very weakly correlated with each other: no signal correlates with any other signal with a correlation coefficient over 8%. But, as with the example small group of high noise signals in the small example signal group, these example high noise signals are synthesized to include actual correlation which is masked by the high noise level of the signals. Note that, under a fixed threshold approach to signal eviction, a threshold set in a range of 30%-40% (0.3-0.4), or even as low as 10% (0.1), would exclude all ten of these time series for the example low noise signals is 5000 observations or samples. Visual comparison of the twenty example low noise signals shows clear correlation between the signals.

TABLE 5 shows the first ten ranks of a cross correlation coefficient matrix generated for the first ten example low noise signals in the large group of signals, Signal #1 710, Signal #2 712, Signal #3 714, Signal #4 716, Signal #5 718, Signal #6 720, Signal #7 722, Signal #8 724, Signal #9 726, and Signal #10 728.

TABLE 5

Low Noise σ Cross Correlation Coefficient Matrix

| | Rank 1 | Rank 2 | Rank 3 | Rank 4 | Rank 5 | Rank 6 | Rank 7 | Rank 8 | Rank 9 | Rank 10 |
|---|---|---|---|---|---|---|---|---|---|---|
| Sig. # 1 CC | Sig. # 1 1 | Sig. # 3 0.9607 | Sig. # 9 0.9600 | Sig. # 19 0.9597 | Sig. # 4 0.9594 | Sig. # 7 0.9592 | Sig. # 6 0.9591 | Sig. # 5 0.9589 | Sig. # 18 0.9589 | Sig. # 15 0.9588 |
| Sig. # 2 CC | Sig. # 2 1 | Sig. # 4 0.9600 | Sig. # 12 0.9595 | Sig. # 18 0.9595 | Sig. # 6 0.9594 | Sig. # 15 0.9592 | Sig. # 20 0.9590 | Sig. # 7 0.9590 | Sig. # 8 0.9589 | Sig. # 17 0.9588 |
| Sig. # 3 CC | Sig. # 3 1 | Sig. # 18 0.9610 | Sig. # 1 0.9607 | Sig. # 4 0.9604 | Sig. # 9 0.9601 | Sig. # 5 0.9599 | Sig. # 12 0.9599 | Sig. # 6 0.9599 | Sig. # 19 0.9597 | Sig. # 11 0.9597 |
| Sig. # 4 CC | Sig. # 4 1 | Sig. # 9 0.9605 | Sig. # 3 0.9604 | Sig. # 15 0.9600 | Sig. # 18 0.9600 | Sig. # 2 0.9600 | Sig. # 11 0.9599 | Sig. # 17 0.9599 | Sig. # 5 0.9598 | Sig. # 7 0.9597 |
| Sig. # 5 CC | Sig. # 5 1 | Sig. # 18 0.9602 | Sig. # 3 0.9599 | Sig. # 6 0.9599 | Sig. # 4 0.9598 | Sig. # 9 0.9597 | Sig. # 16 0.9594 | Sig. # 7 0.9593 | Sig. # 20 0.9591 | Sig. # 13 0.9591 |
| Sig. # 6 CC | Sig. # 6 1 | Sig. # 9 0.9601 | Sig. # 5 0.9599 | Sig. # 3 0.9599 | Sig. # 18 0.9595 | Sig. # 14 0.9594 | Sig. # 2 0.9594 | Sig. # 12 0.9593 | Sig. # 8 0.9592 | Sig. # 1 0.9591 |
| Sig. # 7 CC | Sig. # 7 1 | Sig. # 9 0.9601 | Sig. # 4 0.9597 | Sig. # 12 0.9596 | Sig. # 15 0.9596 | Sig. # 3 0.9595 | Sig. # 18 0.9594 | Sig. # 20 0.9593 | Sig. # 5 0.9593 | Sig. # 16 0.9593 |
| Sig. # 8 CC | Sig. # 8 1 | Sig. # 18 0.9592 | Sig. # 6 0.9592 | Sig. # 4 0.9590 | Sig. # 9 0.9589 | Sig. # 2 0.9589 | Sig. # 12 0.9586 | Sig. # 7 0.9585 | Sig. # 17 0.9581 | Sig. # 3 0.9581 |
| Sig. # 9 CC | Sig. # 9 1 | Sig. # 18 0.9609 | Sig. # 4 0.9605 | Sig. # 12 0.9601 | Sig. # 3 0.9601 | Sig. # 7 0.9601 | Sig. # 6 0.9601 | Sig. # 1 0.9600 | Sig. # 5 0.9597 | Sig. # 17 0.9596 |
| Sig. # 10 CC | Sig. # 10 1 | Sig. # 3 0.9596 | Sig. # 9 0.9594 | Sig. # 4 0.9590 | Sig. # 18 0.9588 | Sig. # 2 0.9586 | Sig. # 20 0.9586 | Sig. # 14 0.9585 | Sig. # 7 0.9585 | Sig. # 11 0.9583 |

While TABLE 5 is truncated to the first ten ranks and first ten signals and does not show ranks 11-20 or rows for signal #s 11-20 due to space considerations in this document, the subset of information displayed demonstrates that the 20 low noise signals are highly correlated: each signal correlates with each other signal with a correlation coefficient of over 95% through the tenth rank. The eviction discriminator as generated by the systems, methods, and other embodiments for eviction of weakly correlated signals from multivariate anomaly detection models will not exclude any of these signals from inclusion in a multivariate ML model, and thus continues to scale to this larger dataset of signals without loss in accuracy or performance.

—Experimental Validation—Large Signal Group with High Signal Noise—

Figure 8A:
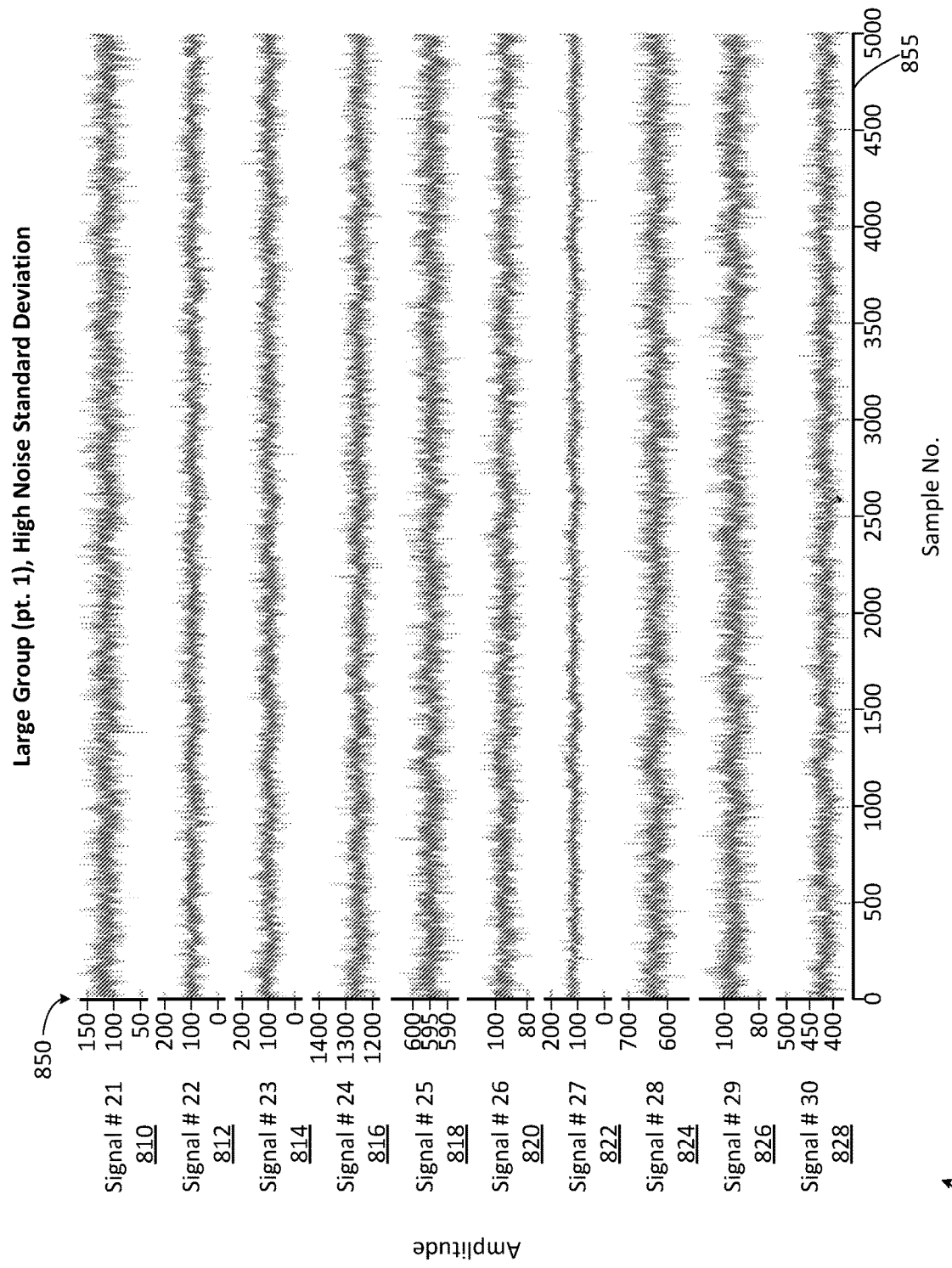
FIG. 8A illustrates a plot of a first ten signals of an example large group of twenty signals synthesized with a high standard deviation for noise, in one embodiment.
Figure 8B:
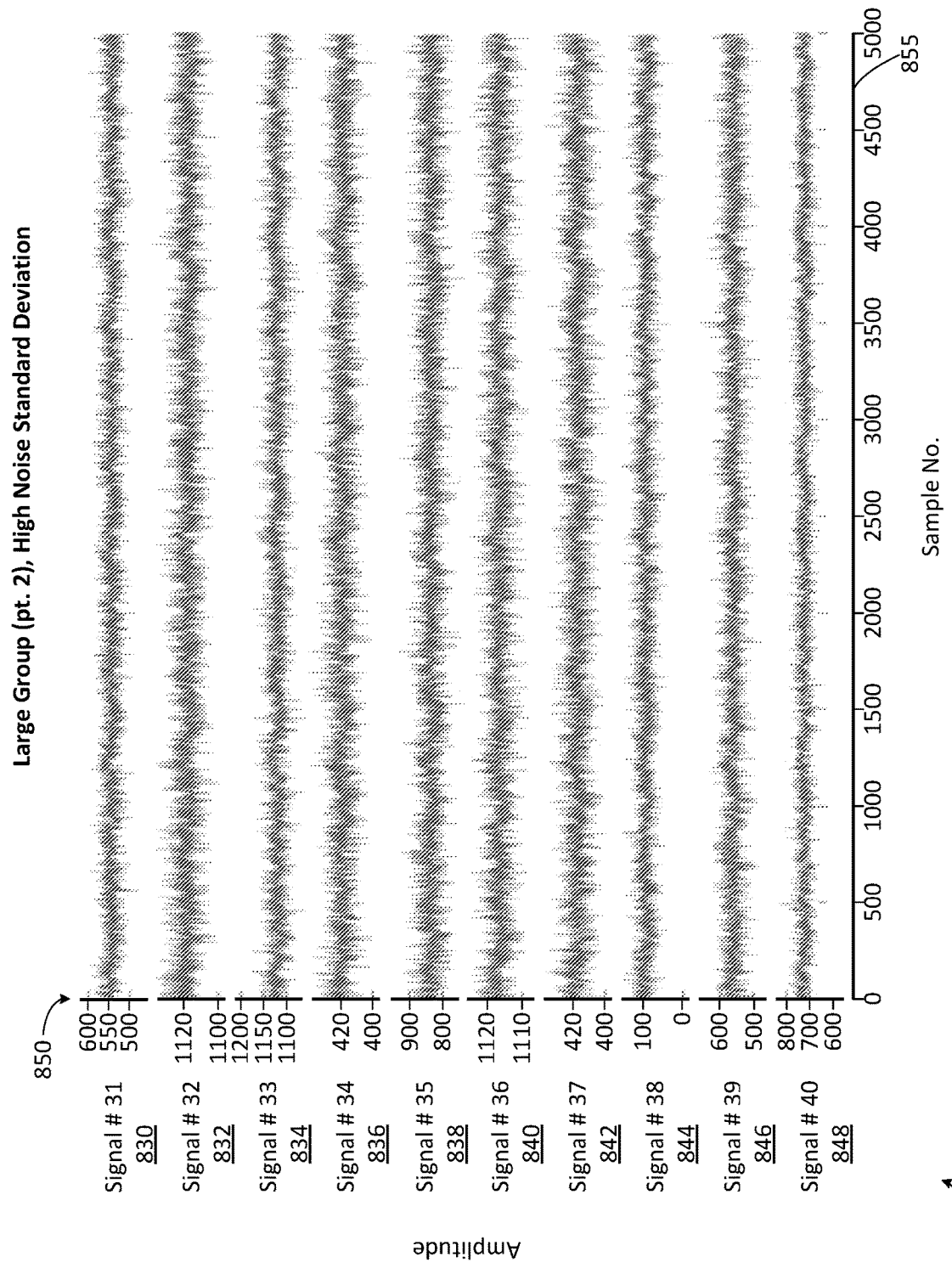
FIG. 8B illustrates a plot of a second ten signals of the example large group of twenty signals, in one embodiment.

FIG. 8A illustrates a plot 800 of the first ten signals of an example large group of twenty signals synthesized with a high standard deviation for noise, and FIG. 8B illustrates a plot 805 of the second ten signals of the example large group of twenty signals. Example high noise signals Signal #21 810, Signal #22 812, Signal #23 814, Signal #24 816, Signal #25 818, Signal #26 820, Signal #27 822, Signal #28 824, Signal #29 826, Signal #30 828, Signal #31 830, Signal #32 832, Signal #33 834, Signal #34 836, Signal #35 838, Signal #36 840, Signal #37 842, Signal #38 844, Signal #39 846, and Signal #40 848 are each plotted against an amplitude axis 850 (shown in axis segments individually scaled with respect to the associated signal) and an observation or sample number axis 855. The number of observations (#Obs) or length of the time series for the example low noise signals is 5000 observations or samples. Visual comparison of the twenty example high noise signals does not readily reveal correlation between the example high noise signals.

TABLE 6 shows the first ten ranks of a cross correlation coefficient matrix generated for the first ten example high noise signals in the large group of signals, Signal #21 810, Signal #22 812, Signal #23 814, Signal #24 816, Signal #25 818, Signal #26 820, Signal #27 822, Signal #28 824, Signal #29 826, and Signal #30 828.

TABLE 6

High Noise σ Cross Correlation Coefficient Matrix

| | Rank 1 | Rank 2 | Rank 3 | Rank 4 | Rank 5 | Rank 6 | Rank 7 | Rank 8 | Rank 9 | Rank 10 |
|---|---|---|---|---|---|---|---|---|---|---|
| Sig. # 21 CC | Sig. # 21 1 | Sig. # 31 0.0797 | Sig. # 26 0.0758 | Sig. # 34 0.0730 | Sig. # 29 0.0703 | Sig. # 27 0.0699 | Sig. # 23 0.0683 | Sig. # 25 0.0631 | Sig. # 24 0.0606 | Sig. # 32 0.0598 |
| Sig. # 22 CC | Sig. # 22 1 | Sig. # 25 0.0932 | Sig. # 30 0.0726 | Sig. # 38 0.0699 | Sig. # 33 0.0635 | Sig. # 37 0.0625 | Sig. # 28 0.0611 | Sig. # 24 0.0596 | Sig. # 34 0.0561 | Sig. # 29 0.0552 |
| Sig. # 23 CC | Sig. # 23 1 | Sig. # 36 0.0982 | Sig. # 26 0.0878 | Sig. # 24 0.0868 | Sig. # 31 0.0839 | Sig. # 40 0.0820 | Sig. # 32 0.0785 | Sig. # 27 0.0718 | Sig. # 35 0.0693 | Sig. # 29 0.0689 |
| Sig. # 24 CC | Sig. # 24 1 | Sig. # 23 0.0868 | Sig. # 34 0.0786 | Sig. # 38 0.0735 | Sig. # 28 0.0634 | Sig. # 39 0.0633 | Sig. # 21 0.0606 | Sig. # 22 0.0596 | Sig. # 26 0.0569 | Sig. # 29 0.0558 |
| Sig. # 25 CC | Sig. # 25 1 | Sig. # 22 0.0932 | Sig. # 29 0.0720 | Sig. # 27 0.0679 | Sig. # 37 0.0671 | Sig. # 26 0.0654 | Sig. # 28 0.0642 | Sig. # 38 0.0636 | Sig. # 32 0.0632 | Sig. # 21 0.0631 |
| Sig. # 26 CC | Sig. # 26 1 | Sig. # 23 0.0878 | Sig. # 34 0.0823 | Sig. # 21 0.0758 | Sig. # 40 0.0740 | Sig. # 30 0.0694 | Sig. # 35 0.0657 | Sig. # 25 0.0654 | Sig. # 37 0.0609 | Sig. # 36 0.0581 |
| Sig. # 27 CC | Sig. # 27 1 | Sig. # 23 0.0718 | Sig. # 34 0.0714 | Sig. # 21 0.0699 | Sig. # 25 0.0679 | Sig. # 35 0.0580 | Sig. # 33 0.0554 | Sig. # 22 0.0552 | Sig. # 38 0.0537 | Sig. # 32 0.0521 |
| Sig. # 28 CC | Sig. # 28 1 | Sig. # 39 0.0677 | Sig. # 37 0.0672 | Sig. # 33 0.0662 | Sig. # 25 0.0642 | Sig. # 23 0.0642 | Sig. # 24 0.0634 | Sig. # 22 0.0611 | Sig. # 31 0.0544 | Sig. # 29 0.0520 |
| Sig. # 29 CC | Sig. # 29 1 | Sig. # 25 0.0720 | Sig. # 37 0.0713 | Sig. # 21 0.0703 | Sig. # 38 0.0699 | Sig. # 23 0.0689 | Sig. # 40 0.0677 | Sig. # 31 0.0602 | Sig. # 30 0.0600 | Sig. # 34 0.0587 |
| Sig. # 30 CC | Sig. # 30 1 | Sig. # 35 0.0888 | Sig. # 31 0.0754 | Sig. # 22 0.0726 | Sig. # 40 0.0700 | Sig. # 37 0.0696 | Sig. # 26 0.0694 | Sig. # 23 0.0625 | Sig. # 29 0.0600 | Sig. # 34 0.0590 |

As with TABLE 5 above, TABLE 6 is truncated to the first ten ranks and first ten signals of the example large group of twenty high noise signals for space considerations. TABLE 6 yet again shows example high noise signals to be very weakly correlated—no signal correlates with any other signal with a correlation coefficient over 10%—despite the fact that the example high noise signals are synthesized so as to have actual correlation. The eviction discriminator generated as shown and described herein will retain and not evict or exclude these high noise signals from use in a multivariate ML model even when included in a database with low noise signals, such as those discussed above with reference to FIGS. 7A and 7B and TABLE 5. The eviction discriminator as generated by the systems, methods, and other embodiments described herein thus continues to scale to this yet larger dataset of signals without loss in accuracy or performance.

—Experimental Validation—Histograms for Eviction Discriminator Value—

For experimental validation of the stability of the mean of the maximum absolute value of the cross correlation coefficient over multiple iterations, example histograms are shown of the Max(Abs(CCC) values for multiple example datasets using the new approach for a recursive looping with 1-at-a-time insertion of pseudo-random signals followed taking the mean of the histogram of max(abs(ccc)). As is visible in the example histograms, the autonomously derived eviction discriminator shows extremely small variability.

Figure 9:
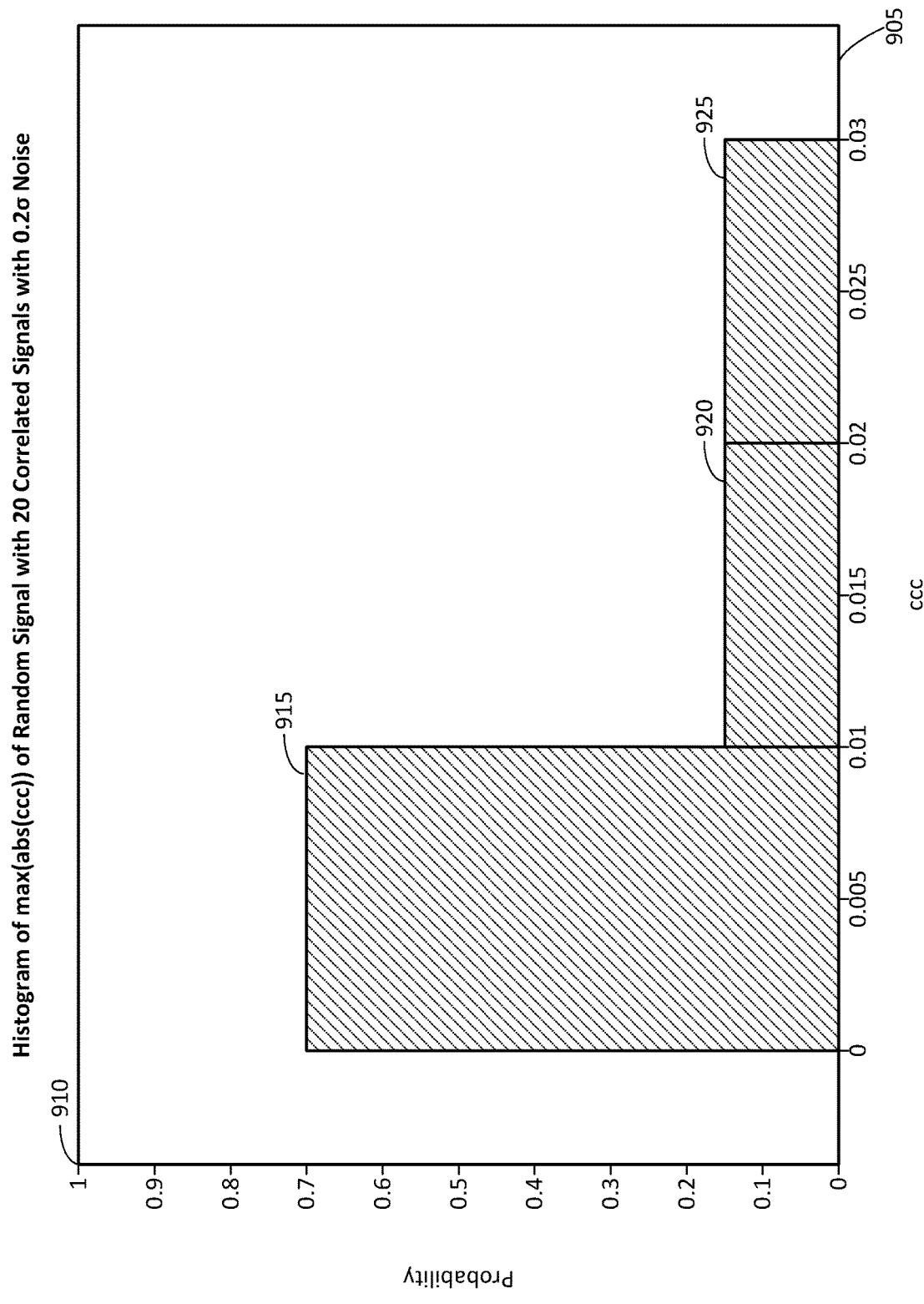
FIG. 9 illustrates a plot of an example histogram of maximum absolute value of cross correlation coefficient cross coefficient of a random signal with 20 correlated, low noise signals, repeated 20 times, in one embodiment.

FIG. 9 illustrates a plot of an example histogram 900 of maximum absolute value of cross correlation coefficient cross coefficient of a random signal with 20 correlated, low noise signals, repeated 20 times. The example histogram 900 is plotted against a cross correlation coefficient axis 905 and a probability axis 910. Example histogram 900 thus represents 20 recursive instantiations of pseudo random signal insertions, one at a time, into a signal collection or database of the 20 correlated low noise signals. In example histogram 900, the 20 correlated signals are synthesized to have noise ratios of 0.2 standard deviation of noise overlaid on signal. Noise ratio is the ratio of the power of background noise to the power of the signal, and thus the inverse of signal-to-noise ratio. The 20 correlated signals are thus a low-noise dataset, having signals that represent monitored phenomena with high accuracy. The spread in the Max(Abs(CCC)) histogram is quite small, from 0 to 0.03. For this signal database, 70% of the time, the Max(Abs(CCC) is between 0 and 0.01 as shown by histogram bar 915; 15% of the time, the Max(Abs(CCC) is between 0.01 and 0.02 as shown by histogram bar 920; and 15% of the time, the Max(Abs(CCC) is between 0.02 and 0.03 as shown by histogram bar 925. The mean of the histogram of (Mean(Max(Abs(CCC)))) is thus 0.0095. The variation in Mean(Max(Abs(CCC))) is also very small. When this process is repeated multiple times, there is less than 0.1% variation in the Mean(Max(Abs (CCC))).

Figure 10:
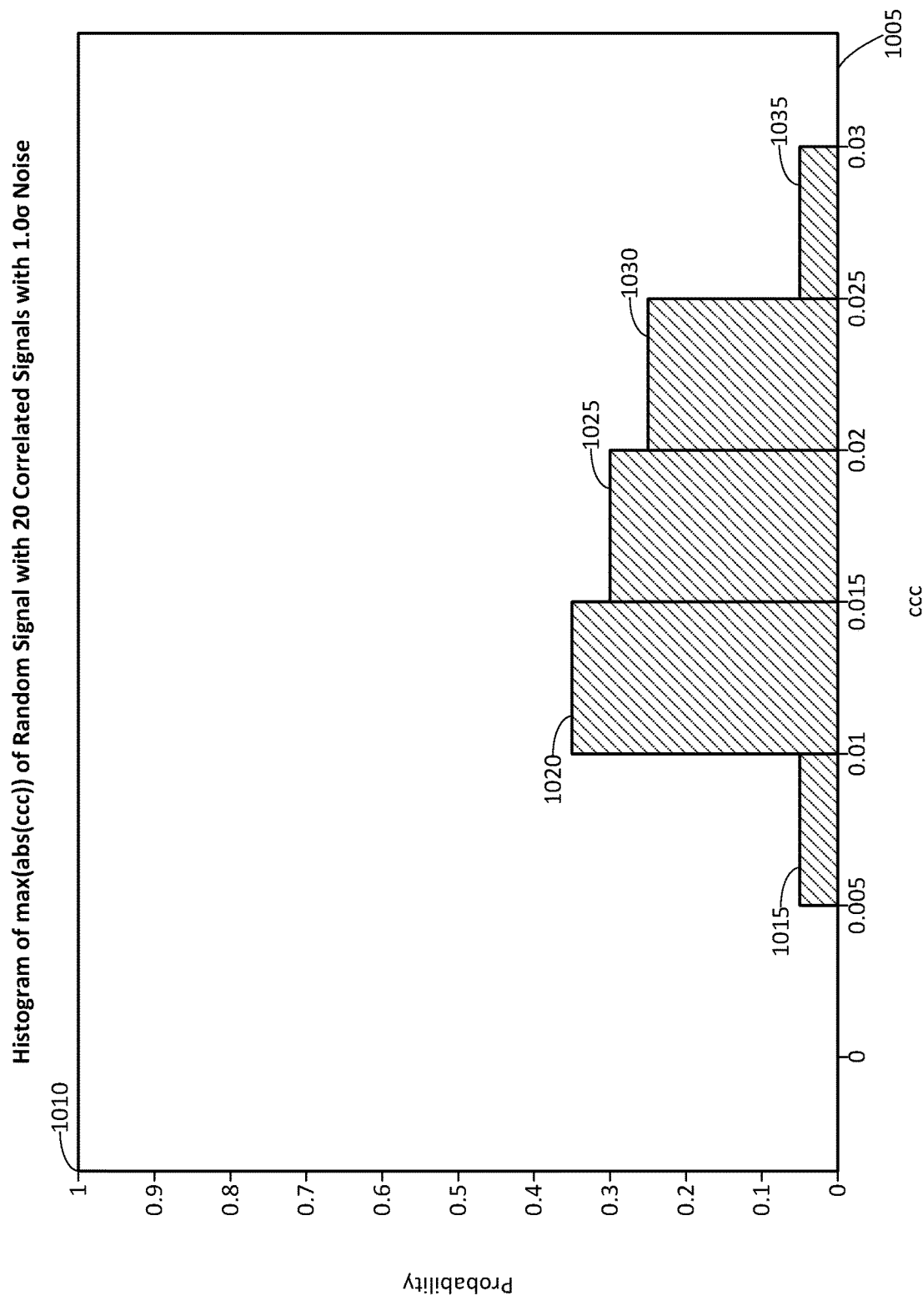
FIG. 10 illustrates a plot of an example histogram of maximum absolute value of cross correlation coefficient cross coefficient of a random signal with 20 correlated, high noise signals, repeated 20 times, in one embodiment.

FIG. 10 illustrates a plot of an example histogram 1000 of maximum absolute value of cross correlation coefficient cross coefficient of a random signal with 20 correlated, high noise signals, repeated 20 times. The example histogram 1000 is plotted against a cross correlation coefficient axis 1005 and a probability axis 1010. Example histogram 1000 thus represents 20 recursive instantiations of pseudo random signal insertions, one at a time, into a signal collection or database of the 20 correlated high noise signals. In example histogram 900, the 20 correlated signals are synthesized to have noise ratios of 1.0 standard deviation of noise overlaid on signal. The 20 correlated signals are thus a high-noise dataset, having signals that represent monitored phenomena with lower accuracy. Nevertheless, the spread in the histogram is again tiny, from 0.005 to 0.030. For this signal database, 5% of the time, the Max(Abs(CCC) is between 0.005 and 0.010 as shown by histogram bar 1015; 35% of the time, the Max(Abs(CCC) is between 0.010 and 0.015 as shown by histogram bar 1020; 30% of the time, the Max (Abs(CCC) is between 0.015 and 0.020 as shown by histogram bar 1025; 25% of the time, the Max(Abs(CCC) is between 0.020 and 0.025 as shown by histogram bar 1030; and 5% of the time, the Max(Abs(CCC) is between 0.025 and 0.030 as shown by histogram bar 1035. The mean of the histogram (Mean(Max(Abs(CCC)))) is thus 0.017. Also, the variability in the Mean(Max(Abs(CCC))) is again <0.1%.

From FIGS. 9 and 10, it is evident that whether the end use case is high accuracy low noise signals, or low accuracy high noise signals, the variability in the autonomously derived robust discrimination function for eviction of weakly correlated signals from multivariate anomaly detection models as shown and described herein is under 0.1%, indicating that the end user has over 99.9% assurance that signals being evicted truly are not contributing to the prognostic power of the multivariate ML model.

To confirm that the results are not skewed by the fact that the signal databases for FIGS. 9 and 10 are made up entirely of simulated signals, the same procedure is applied to two signal databases that have been synthesized to emulate real-world signal databases. Two real-world signal databases were decomposed into their deterministic and stochastic components, and new signals that behave just like the original signals—possessing similar statistical qualities such as mean, variance, skewness, kurtosis, degree of serial and cross correlation—are generated, thus preserving the anonymity of the signals, but fully emulating their characteristics. As is evident from the following histograms for these two use cases, the variability in the eviction discriminator for eviction of weakly correlated signals from multivariate anomaly detection models as shown and described herein remains under 0.1%, retaining the over 99.9% assurance that signals being evicted truly are not contributing to the prognostic power of the multivariate ML model when applied to real-world signals.

Figure 11:
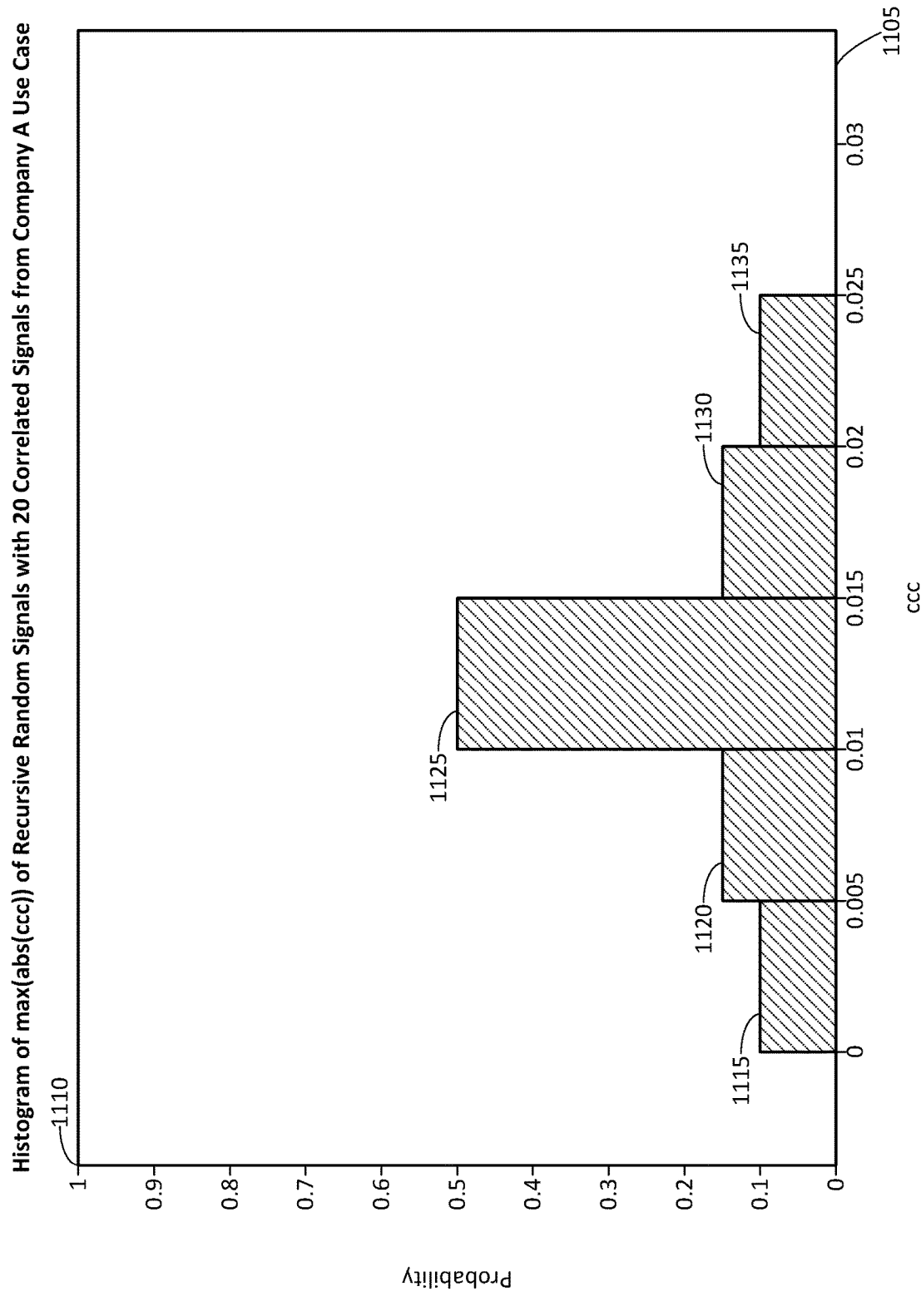
FIG. 11 illustrates a plot of an example histogram of maximum absolute value of cross correlation coefficients for a random signal with 20 correlated signals from a company A use case, repeated 20 times, in one embodiment.

FIG. 11 illustrates a plot of an example histogram 1100 of maximum absolute value of cross correlation coefficient of a random signal with 20 correlated signals from a company A use case, repeated 20 times. The example histogram 1100 is plotted against a cross correlation coefficient axis 1105 and a probability axis 1110. Example histogram 1100 thus represents 20 recursive instantiations of pseudo random signal insertions, one at a time, into a signal collection or database of the 20 correlated signals having characteristics of signals monitored by company A. The noise ratio varies from signal to signal in the signal database. Again, the spread in the Max(Abs(CCC)) histogram is quite small, from 0 to 0.025. For this signal database, 10% of the time, the Max(Abs(CCC) is between 0 and 0.005 as shown by histogram bar 1115; 15% of the time, the Max(Abs(CCC) is between 0.005 and 0.010 as shown by histogram bar 1120; 50% of the time, the Max(Abs(CCC) is between 0.010 and 0.015 as shown by histogram bar 1125; 15% of the time, the Max(Abs(CCC) is between 0.015 and 0.020 as shown by histogram bar 1130; and 10% of the time, the Max(Abs (CCC) is between 0.020 and 0.025 as shown by histogram bar 1135. The mean of the histogram (Mean(Max(Abs (CCC)))) is thus 0.0125. Again, the variation in Mean(Max (Abs(CCC))) is also very small. When this process is repeated multiple times, there is less than 0.1% variation in the Mean(Max(Abs(CCC))).

Figure 12:
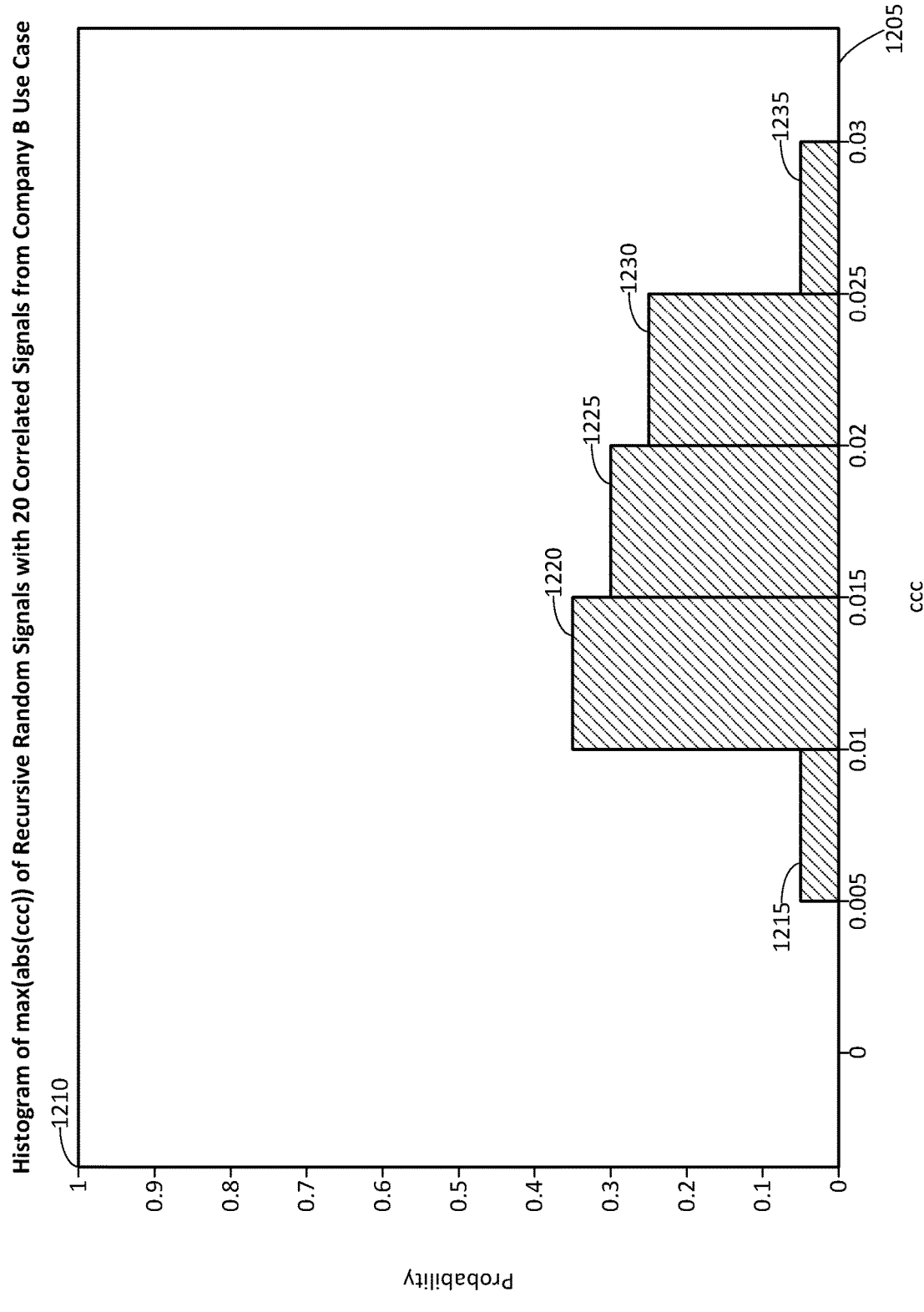
FIG. 12 illustrates a plot of an example histogram of maximum absolute value of cross correlation coefficients for a random signal with 20 correlated signals from a company B use case, repeated 20 times, in one embodiment.

FIG. 12 illustrates a plot of an example histogram 1200 of maximum absolute value of cross correlation coefficient of a random signal with 20 correlated signals from a company B use case, repeated 20 times. The example histogram 1200 is plotted against a cross correlation coefficient axis 1205 and a probability axis 1210. Example histogram 1200 thus represents 20 recursive instantiations of pseudo random signal insertions, one at a time, into a signal collection or database of the 20 correlated signals having characteristics of signals monitored by company B. The noise ratio varies from signal to signal in the signal database. Again, the spread in the Max(Abs(CCC)) histogram is quite small, from 0.005 to 0.030. For this signal database, 5% of the time, the Max(Abs(CCC) is between 0.005 and 0.010 as shown by histogram bar 1215; 35% of the time, the Max(Abs(CCC) is between 0.010 and 0.015 as shown by histogram bar 1220; 30% of the time, the Max(Abs(CCC) is between 0.015 and 0.020 as shown by histogram bar 1225; 25% of the time, the Max(Abs(CCC) is between 0.020 and 0.025 as shown by histogram bar 1230; and 5% of the time, the Max(Abs(CCC) is between 0.025 and 0.030 as shown by histogram bar 1235. The mean of the histogram (Mean(Max(Abs(CCC)))) is thus 0.017. Yet again, the variation in Mean(Max(Abs(CCC))) is also very small. When this process is repeated multiple times, there is less than 0.1% variation in the Mean(Max(Abs(CCC))).

To confirm that the results are scalable to larger signal databases, the same procedure for autonomously determining an eviction discriminator is applied to two signal databases that have been synthesized to emulate real-world signal databases for company A and company B with large numbers of signals, in a manner similar to that shown and described with respect to FIGS. 11 and 12 above. As is evident from the following histograms for these two use cases, the variability in the eviction discriminator for eviction of weakly correlated signals from multivariate anomaly detection models as shown and described herein remains under 0.1%, retaining the over 99.9% assurance that signals being evicted truly are not contributing to the prognostic power of the multivariate ML model when applied to large sets of real-world signals.

Figure 13:
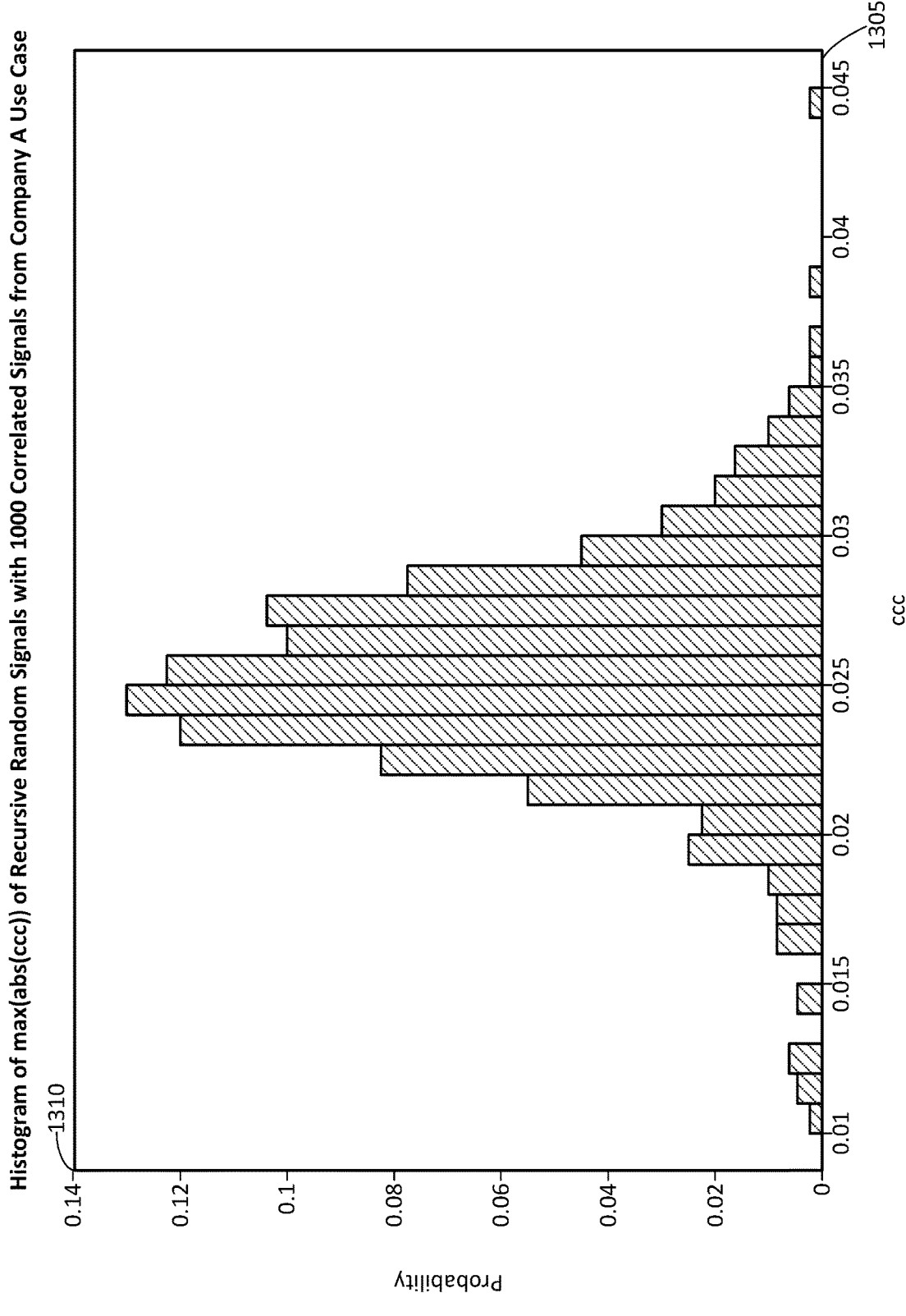
FIG. 13 illustrates a plot of an example histogram of maximum absolute value of cross correlation coefficients for a random signal with 1000 correlated signals from a company A use case, repeated 20 times, in one embodiment.

FIG. 13 illustrates a plot of an example histogram 1300 of maximum absolute value of cross correlation coefficient of a random signal with 1000 correlated signals from a company A use case, repeated 20 times. The example histogram 1300 is plotted against a cross correlation coefficient axis 1305 and a probability axis 1310. Example histogram 1300 thus represents 20 recursive instantiations of pseudo random signal insertions, one at a time, into a larger signal collection or database of the 1000 correlated signals having characteristics of signals monitored by company A. The noise ratio varies from signal to signal in the signal database. Even with the large quantity of signals, the spread in the Max(Abs(CCC)) histogram remains quite small, from 0.01 to 0.045. The variation in Mean(Max(Abs(CCC))) is also very small. When this process is repeated multiple times, there is less than 0.1% variation in the Mean(Max(Abs(CCC))).

Figure 14:
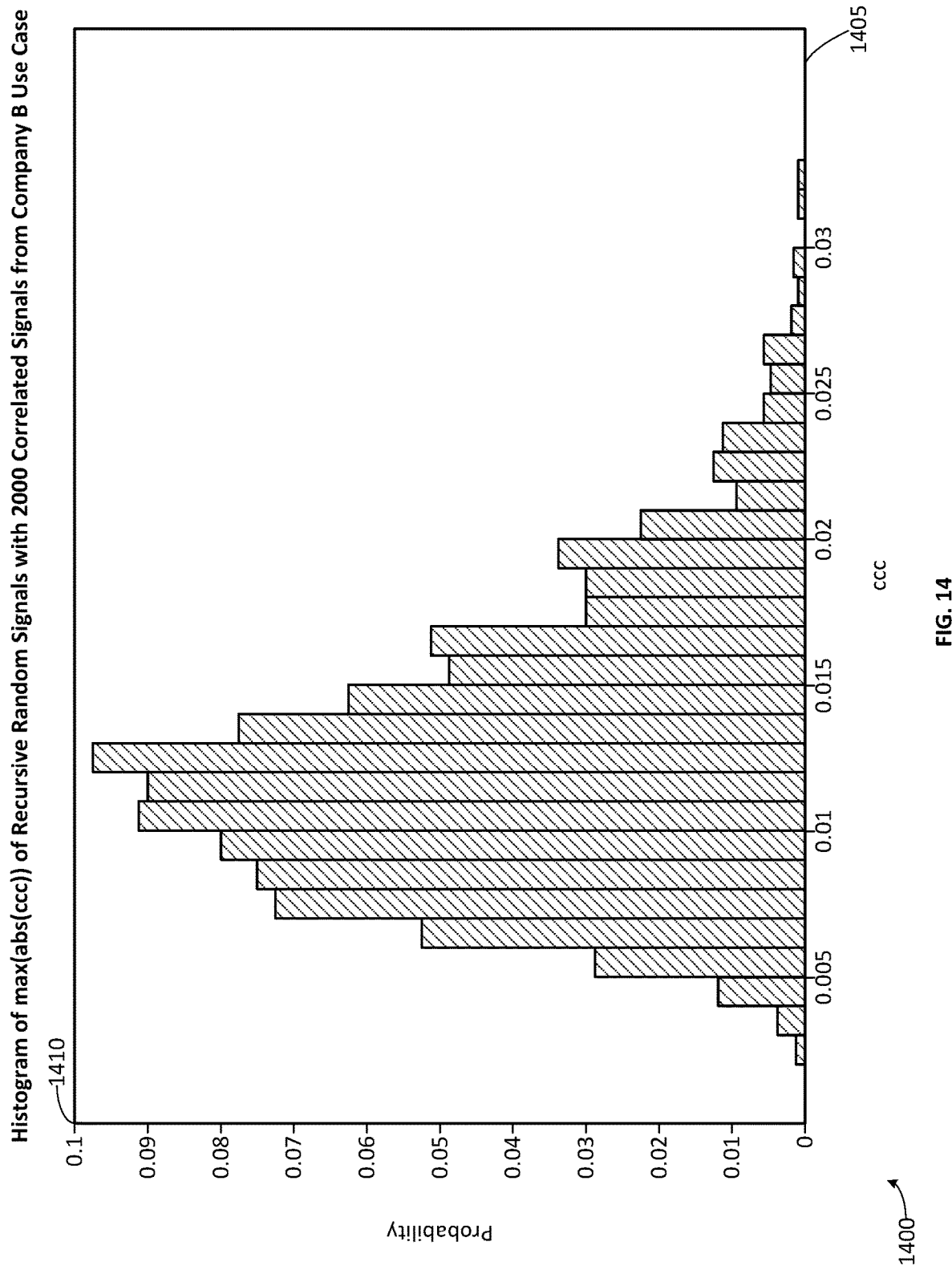
FIG. 14 illustrates a plot of an example histogram of maximum absolute value of cross correlation coefficients for a random signal with 2000 correlated signals from a company B use case, repeated 20 times, in one embodiment.

FIG. 14 illustrates a plot of an example histogram 1400 of maximum absolute value of cross correlation coefficient of a random signal with 2000 correlated signals from a company B use case, repeated 20 times. The example histogram 1400 is plotted against a cross correlation coefficient axis 1405 and a probability axis 1410. Example histogram 1400 thus represents 20 recursive instantiations of pseudo random signal insertions, one at a time, into a yet even larger signal collection or database of the 2000 correlated signals having characteristics of signals monitored by company B. The noise ratio varies from signal to signal in the signal database. Even with a still larger quantity of signals, the spread in the Max(Abs(CCC)) histogram remains quite small, from 0 to 0.035. The variation in Mean(Max(Abs(CCC))) is also very small. When this process is repeated multiple times, there is less than 0.1% variation in the Mean(Max(Abs(CCC))).

Thus, as shown by histograms 1300 and 1400, the prior conclusions based on small scale dataset remain valid at a large scale dataset. The width of the histogram is very narrow, and Mean(Max(Abs(CCC))) remains a very stable value to use as an eviction discriminator for eviction of weakly correlated signals from multivariate anomaly detection models.

The systems, methods, and other embodiments described herein for eviction of weakly correlated signals from multivariate anomaly detection models present improved scanning of a collection of time series signals and discrimination between the signals to either (i) eliminate because they have no meaningful correlation with any other signals, or (ii) include in the multivariate ML anomaly detection algorithm. In one embodiment, the embodiments described herein for eviction of weakly correlated signals from multivariate anomaly detection models introduce a novel dual-level looping algorithm that recursively injects pseudo-random signals, one at a time, and autonomously derives an empirical discrimination function that robustly evicts—that is, removes from availability for inclusion in the ML model or otherwise eliminates—signals that have no or very weak correlation with the other signals in the database of time series signals.

In one embodiment, signals in a database (DB) of time series that have no (or very weak) correlation with other signals may be separated out by the eviction method and passed for analysis to various univariate anomaly detection algorithms. In one embodiment, the eviction systems enable accurate automatic discrimination between the signals to evict (eliminate or exclude) from a multivariate ML anomaly detection algorithm versus the signals to include in the multivariate ML anomaly detection algorithm.

The eviction systems and methods described herein enable automated resolution of CCC ranking in favor of meaningfully correlated signals over signals without meaningful correlation, where no such resolution or automation was previously possible. In one embodiment, the eviction systems and methods provide an improved autonomous prescreening algorithm that judiciously and robustly (accurately) segregates the signals with real causality association (even if weakened by high measurement noise and small models) from signals that have no possible correlation content.

Extensive reduction-to-practice exercises conducted by the inventors demonstrate that that the eviction systems and methods described herein achieves >99.9% efficiency and is far superior to imposing a simple fixed threshold on cross-correlation coefficients for discrimination. These exercises include exercises with known "ground truth" signals possessing varying degrees of correlation, and others possessing no correlation.

The systems, methods, and other embodiments for eviction of weakly correlated signals from multivariate anomaly detection models described herein allow automated identification and removal of signals that do not contribute to prognostic performance of a ML anomaly detection model, where such automated identification and removal was not previously possible. The systems, methods, and other embodiments described herein allow retention of noisy signals that do contribute to prognostic performance, where such retention was not previously possible. The systems, methods, and other embodiments described herein enable improved prognostic performance from multivariate machine learning anomaly detection models due to eviction of signals that detract from prognostic performance of the model and retention of signals that contribute to prognostic performance despite including higher noise levels. The systems, methods, and other embodiments described herein reduce compute overhead for prognostic models exhibiting equivalent or improved performance due to elimination of need to process non-contributing signals, and instead dedicate processing to truly contributing signals.

When executed on a benchmark computing system, ML prognostic models using the automatically retained signals and excluding the automatically evicted signals exhibit improved prognostic performance over models that have not had signals automatically retained/evicted as described herein. In particular, multivariate ML prognostic surveillance is more accurate where weakly correlated signals are excluded in accordance with the systems methods, and other embodiments described herein for eviction of weakly correlated signals, having both fewer false alarms and fewer missed alarms when implemented on a benchmark system than multivariate ML prognostic surveillance where signals are evicted using a fixed cut-off threshold approach. Additionally, multivariate ML prognostic surveillance is more sensitive where weakly correlated signals are excluded in accordance with the systems methods, and other embodiments described herein for eviction of weakly correlated signals, detecting subtle anomalies in noisy process metrics earlier and/or with slighter deviation than multivariate ML prognostic surveillance where signals are evicted using a fixed cut-off threshold approach In one embodiment, the eviction systems and methods described herein may be implemented on a variety of multivariate prognostic ML systems or services, for example, Oracle Autonomous Anomaly Detection Service, other multivariate prognostic ML services offered by GE PREDIX, Microsoft Azure, Amazon Web Services Sitewise, SAP/Siemens Intelligent Asset Management.

Software Module Embodiments

In general, software instructions are designed to be executed by one or more suitably programmed processor accessing memory, such as by accessing CPU or GPU resources. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by a main program for the system, an operating system (OS), or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Cloud or Enterprise Embodiments

In one embodiment, the present system (such as time series data service 105) is a computing/data processing system including a computing application or collection of distributed computing applications for access and use by other client computing devices associated with an enterprise (such as the client computers 145, 150, 155, and 160 of enterprise network 115) that communicate with the present system over a network (such as network 110). The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment time series data service 105 is a centralized server-side application that provides at least the functions disclosed herein and that is accessed by many users via computing devices/terminals communicating with the computers of time series data service 105 (functioning as one or more servers) over a computer network.

Computing Device Embodiment

Figure 15:
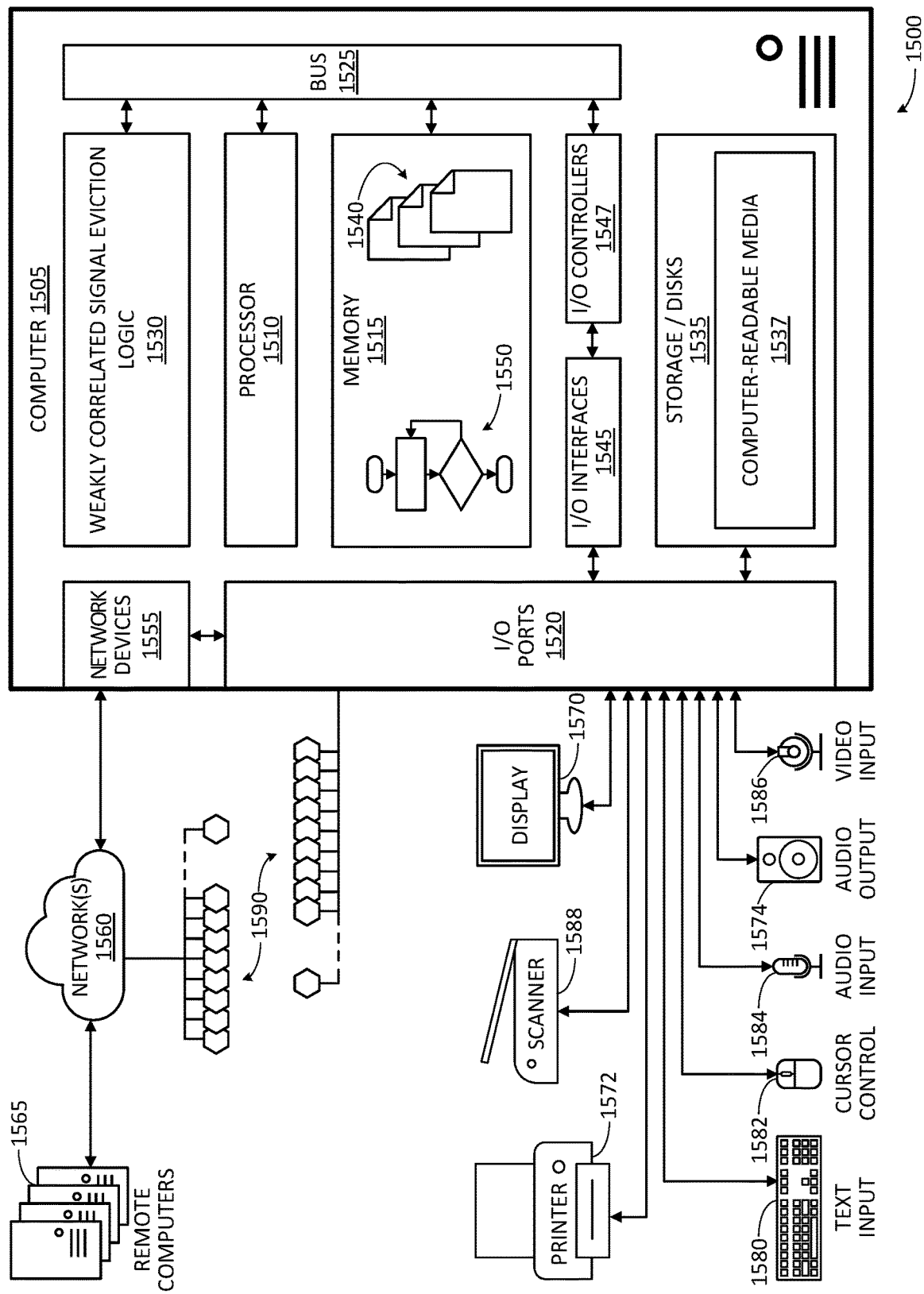
FIG. 15 illustrates an embodiment of a computing system configured with the example systems and/or methods disclosed.

FIG. 15 illustrates an example computing system 1500 that is configured and/or programmed as a special purpose computing device with one or more of the example systems and methods described herein, and/or equivalents. The example computing system 1500 may include a computer 1505 that includes at least one hardware processor 1510, a memory 1515, and input/output ports 1520 operably connected by a bus 1525. In one example, the computer 1505 may include weakly correlated signal eviction logic 1530 configured to facilitate eviction of weakly correlated signals from multivariate anomaly detection models, similar to the logic and system shown and described with reference to FIGS. 1-14.

In different examples, the logic 1530 may be implemented in hardware, a non-transitory computer-readable medium 1537 with stored instructions, firmware, and/or combinations thereof. While the logic 1530 is illustrated as a hardware component attached to the bus 1525, it is to be appreciated that in other embodiments, the logic 1530 could be implemented in the processor 1510, stored in memory 1515, or stored in disk 1535.

In one embodiment, logic 1530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to evict weakly correlated signals from multivariate anomaly detection models. The means may also be implemented as stored computer executable instructions that are presented to computer 1505 as data 1540 that are temporarily stored in memory 1515 and then executed by processor 1510.

Logic 1530 may also provide means (e.g., hardware, non-transitory computer-readable medium that stores executable instructions, firmware) for performing eviction of weakly correlated signals from multivariate anomaly detection models.

Generally describing an example configuration of the computer 1505, the processor 1510 may be a variety of various processors including dual microprocessor and other multi-processor architectures. A memory 1515 may include volatile memory and/or non-volatile memory. Non-volatile memory may include, for example, ROM, PROM, and so on. Volatile memory may include, for example, RAM, SRAM, DRAM, and so on.

A storage disk 1535 may be operably connected to the computer 1505 via, for example, an input/output (I/O) interface (e.g., card, device) 1545 and an input/output port 1520 that are controlled by at least an input/output (I/O) controller 1547. The disk 1535 may be, for example, a magnetic disk drive, a solid state disk drive, a floppy disk drive, a tape drive, a Zip drive, a flash memory card, a memory stick, and so on. Furthermore, the disk 1535 may be a CD-ROM drive, a CD-R drive, a CD-RW drive, a DVD ROM, and so on. The memory 1515 can store a process 1550 and/or a data 1540, for example. The disk 1535 and/or the memory 1515 can store an operating system that controls and allocates resources of the computer 1505.

The computer 1505 may interact with, control, and/or be controlled by input/output (I/O) devices via the input/output (I/O) controller 1547, the I/O interfaces 1545, and the input/output ports 1520. Input/output devices may include, for example, one or more displays 1570, printers 1572 (such as inkjet, laser, or 3D printers), audio output devices 1574 (such as speakers or headphones), text input devices 1580 (such as keyboards), cursor control devices 1582 for pointing and selection inputs (such as mice, trackballs, touch screens, joysticks, pointing sticks, electronic styluses, electronic pen tablets), audio input devices 1584 (such as microphones or external audio players), video input devices 1586 (such as video and still cameras, or external video players), image scanners 1588, video cards (not shown), disks 1535, network devices 1555, and so on. The input/output ports 1520 may include, for example, serial ports, parallel ports, and USB ports.

The computer 1505 can operate in a network environment and thus may be connected to the network devices 1555 via the I/O interfaces 1545, and/or the I/O ports 1520. Through the network devices 1555, the computer 1505 may interact with a network 1560. Through the network, the computer 1505 may be logically connected to remote computers 1565. Networks with which the computer 1505 may interact include, but are not limited to, a LAN, a WAN, and other networks.

In one embodiment, the computer may be connected to sensors 1590 through I/O ports 1520 or networks 1560 in order to receive information about physical states of monitored devices and systems.

—Data Operations—

Data can be stored in memory by a write operation, which stores a data value in memory at a memory address. The write operation is generally: (1) use the processor to put a destination address into a memory address register; (2) use the processor to put a data value to be stored at the destination address into a memory data register; and (3) use the processor to copy the data from the memory data register to the memory cell indicated by the memory address register. Stored data can be retrieved from memory by a read operation, which retrieves the data value stored at the memory address. The read operation is generally: (1) use the processor to put a source address into the memory address register; and (2) use the processor to copy the data value currently stored at the source address into the memory data register. In practice, these operations are functions offered by separate software modules, for example as functions of an operating system. The specific operation of processor and memory for the read and write operations, and the appropriate commands for such operation will be understood and may be implemented by the skilled artisan.

Generally, in some embodiments, references to storage or storing indicate storage as a data structure in memory or storage/disks of a computing device (such as memory 1515, or storage/disks 1535 of computing device 1505 or remote computers 1565).

Further, in some embodiments, a database associated with the method may be included in memory. In a database, the storage and retrieval functions indicated may include the self-explanatory 'create,' read, 'update,' or 'delete' data (CRUD) operations used in operating a database. These operations may be initiated by a query composed in the appropriate query language for the database. The specific form of these queries may differ based on the particular form of the database, and based on the query language for the database. For an interaction with a database described herein, the processor composes a query of the indicated database to perform the unique action described. If the query includes a 'read' operation, the data returned by executing the query on the database may be stored as a data structure in a data store, such as data store 130, or in memory. The formation and operation of databases will be understood and may be implemented by the skilled artisan.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

In one embodiment, each step of computer-implemented methods described herein may be performed by a processor (such as processor 1510 as shown and described with reference to FIG. 15) of one or more computing devices (i) accessing memory (such as memory 1515 and/or other computing device components shown and described with reference to FIG. 15) and (ii) configured with logic to cause the system to execute the step of the method (such as weakly correlated signal eviction logic 1530 shown and described with reference to FIG. 15). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 1515, or storage/disks 1535 of computing device 1505 or remote computers 1565 shown and described with reference to FIG. 15, or in data stores 130 shown and described with reference to FIG. 1).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:
generating a mock signal that has at least random signal properties;
generating a mock correlation coefficient between the mock signal and at least one measured time series signal from a collection of measured time series signals;
selecting a discrimination value that indicates a weak signal correlation based at least in part on the mock correlation coefficient;
identifying a first measured signal from the collection of measured time series signals that has the weak signal correlation based on comparing a first correlation coefficient between the first measured signal and a second measured signal to the discrimination value; and
evicting the first measured signal from the collection of measured time series signals in response to identifying that the first measured signal has the weak signal correlation.

2. The computer-implemented method of claim 1, further comprising:
generating one or more additional mock signals that have at least random signal properties, wherein the additional mock signals are generated to have a sequence of signal values unique among the mock signals;
for each of the additional mock signals,
replacing the mock signal with the additional mock signal, and
generating an additional mock correlation coefficient between the additional mock signal and at least one measured time series signal from the collection of measured time series signals;
for each of the mock signals, identifying a maximum magnitude mock correlation coefficient between the mock signal and the measured time series signals; and
finding an average based on the maximum magnitude mock correlation coefficients;
wherein the discrimination value selected is the average of the maximum magnitude mock correlation coefficients.

3. The computer-implemented method of claim 2, wherein a total number of mock signals for which a maximum magnitude mock correlation coefficient is generated either (i) is at least twenty or (ii) causes the average of the maximum magnitude mock correlation coefficients to not vary in a fourth decimal place.

4. The computer-implemented method of claim 2, further comprising:
generating a histogram of the maximum magnitude mock correlation coefficients; and
finding a mean of the histogram;
wherein the average based on the maximum magnitude mock correlation coefficients is the mean of the histogram.

5. The computer-implemented method of claim 1, further comprising generating a Gaussian random number sequence of a given number of observations, wherein signal values of the mock signal are the Gaussian random number sequence, and wherein the given number of observations is a number of observations for the at least one measured time series signal.

6. The computer-implemented method of claim 1, further comprising:
evicting signals in the collection of measured time series signals that have a maximum correlation coefficient with an other signal in the collection of measured time signals that indicates weaker correlation than the discrimination value;
training a multivariate anomaly detection model using signals selected from remaining, non-evicted signals in the collection of measured time series signals, and not using evicted signals; and
monitoring the selected, non-evicted signals with the trained multivariate anomaly detection model to detect anomalies.

7. The computer-implemented method of claim 1, further comprising including the second measured signal in a univariate anomaly detection model in response to identifying that the first measured signal has the weak signal correlation.

8. A non-transitory computer-readable medium that includes stored thereon computer-executable instructions that when executed by at least a processor of a computer cause the computer to:
generate a mock signal that has at least random signal properties;
generate a mock correlation coefficient between the mock signal and at least one measured time series signal from a collection of measured time series signals;
select a discrimination value that indicates a weak signal correlation based at least in part on the mock correlation coefficient;
identify a first measured signal from the collection of measured time series signals that has the weak signal correlation based on comparing a first correlation coefficient between the first measured signal and a second measured signal to the discrimination value; and
evict the first measured signal from the collection of measured time series signals in response to identifying that the first measured signal has the weak signal correlation.

9. The non-transitory computer-readable medium of claim 8, wherein the instructions further cause the computer to:
generate one or more additional mock signals that have at least random signal properties, wherein the additional mock signals are generated to have a sequence of signal values unique among the mock signals;
for each of the additional mock signals,
replace the mock signal with the additional mock signal, and
generate an additional mock correlation coefficient between the additional mock signal and at least one measured time series signal from the collection of measured time series signals;
for each of the mock signals, identify a maximum magnitude mock correlation coefficient between the mock signal and the measured time series signals; and find an average based on the maximum magnitude mock correlation coefficients;
wherein the discrimination value selected is the average of the maximum magnitude mock correlation coefficients.

10. The non-transitory computer-readable medium of claim 9, wherein a total number of mock signals for which a maximum magnitude mock correlation coefficient is generated either (i) is at least twenty or (ii) causes the average of the maximum magnitude mock correlation coefficients to not vary in a fourth decimal place.

11. The non-transitory computer-readable medium of claim 9, wherein the instructions further cause the computer to:
generate a histogram of the maximum magnitude mock correlation coefficients; and
find a mean of the histogram;
wherein the average based on the maximum magnitude mock correlation coefficients is the mean of the histogram.

12. The non-transitory computer-readable medium of claim 8, wherein the instructions further cause the computer to generate a Gaussian random number sequence of a given number of observations, wherein signal values of the mock signal are the Gaussian random number sequence, and wherein the given number of observations is a number of observations for the at least one measured time series signal.

13. The non-transitory computer-readable medium of claim 8, wherein the instructions further cause the computer to:
evict signals in the collection of measured time series signals that have a maximum correlation coefficient with an other signal in the collection of measured time signals that indicates a weaker correlation than the discrimination value;
train a multivariate anomaly detection model using signals selected from remaining, non-evicted signals in the collection of measured time series signals, and not using evicted signals; and
monitor the selected, non-evicted signals with the trained multivariate anomaly detection model to detect anomalies.

14. The non-transitory computer-readable medium of claim 8, wherein the instructions further cause the computer to include the second measured signal in a univariate anomaly detection model in response to identifying that the first measured signal has the weak signal correlation.

15. A computing system comprising:
a processor;
a memory operably connected to the processor;
a non-transitory computer-readable medium operably connected to the processor and memory and storing computer-executable instructions for autonomous discrimination of operation vibration signals that when executed by at least a processor of the computing system cause the computing system to:
generate a mock signal that has at least random signal properties;
generate a mock correlation coefficient between the mock signal and at least one measured time series signal from a collection of measured time series signals;
selecting a discrimination value that indicates a weak signal correlation based at least in part on the mock correlation coefficient;
identify a first measured signal from the collection of measured time series signals that has the weak signal correlation based on comparing a first correlation coefficient between the first measured signal and a second measured signal is smaller than the discrimination value; and
evict the first measured signal from the collection of measured time series signals in response to identifying that the first measured signal has the weak signal correlation.

16. The computing system of claim 15, wherein the instructions further cause the computing system to:
generate one or more additional mock signals that have at least random signal properties, wherein the additional mock signals are generated to have a sequence of signal values unique among the mock signals;
for each of the additional mock signals,
replace the mock signal with the additional mock signal, and
generate an additional mock correlation coefficients between the additional mock signal and at least one measured time series signal from the collection of measured time series signals;
for each of the mock signals, identify a maximum magnitude mock correlation coefficient between the mock signal and the measured time series signals; and
find an average based on the maximum magnitude mock correlation coefficients;
wherein the discrimination value selected is the average of the maximum magnitude mock correlation coefficients.

17. The computing system of claim 16, wherein a total number of mock signals for which a maximum magnitude mock correlation coefficient is generated either (i) is at least twenty or (ii) causes the average of the maximum magnitude mock correlation coefficients to not vary in a fourth decimal place.

18. The computing system of claim 16, wherein the instructions further cause the computing system to:
generate a histogram of the maximum magnitude mock correlation coefficients; and
find a mean of the histogram;
wherein the average based on the maximum magnitude mock correlation coefficients is the mean of the histogram.

19. The computing system of claim 15, wherein the instructions further cause the computing system to generate a Gaussian random number sequence of a given number of observations, wherein signal values of the mock signal are the Gaussian random number sequence, and wherein the given number of observations is a number of observations for the at least one measured time series signal.

20. The computing system of claim 15, wherein the instructions further cause the computing system to:
evict signals in the collection of measured time series signals that have a maximum correlation coefficient with an other signal in the collection of measured time signals that indicates a weaker correlation than the discrimination value;
train a multivariate anomaly detection model using signals selected from remaining, non-evicted signals in the collection of measured time series signals, and not using evicted signals; and
monitor the selected, non-evicted signals with the trained multivariate anomaly detection model to detect anomalies.

* * * * *